(12) United States Patent
Weinberger et al.

(10) Patent No.: US 7,668,869 B2
(45) Date of Patent: Feb. 23, 2010

(54) MEDIA ACCESS SYSTEM

(75) Inventors: Benjamin J. Weinberger, Beaufort, SC (US); James A. Remsey, Beaufort, SC (US)

(73) Assignee: Digitalsmiths Corporation, Research Triangle Park, NC (US)

( * ) Notice: Subject to any disclaimer, the term of this patent is extended or adjusted under 35 U.S.C. 154(b) by 364 days.

(21) Appl. No.: 11/695,766

(22) Filed: Apr. 3, 2007

(65) Prior Publication Data

US 2007/0233738 A1 Oct. 4, 2007

Related U.S. Application Data

(60) Provisional application No. 60/788,992, filed on Apr. 3, 2006.

(51) Int. Cl.
*G06F 17/30* (2006.01)

(52) U.S. Cl. .................... 707/104.1; 707/101; 709/203; 715/210

(58) Field of Classification Search ............... 707/101, 707/102, 104.1; 715/210, 719; 709/203, 709/207
See application file for complete search history.

(56) References Cited

U.S. PATENT DOCUMENTS

| | | | | |
|---|---|---|---|---|
| 5,267,351 A * | 11/1993 | Reber et al. | ............... | 707/104.1 |
| 5,307,456 A * | 4/1994 | MacKay | ..................... | 715/782 |
| 5,544,318 A * | 8/1996 | Schmitz et al. | ............. | 709/207 |
| 5,546,397 A * | 8/1996 | Mahany | ........................ | 370/310 |
| 5,630,121 A * | 5/1997 | Braden-Harder et al. | .... | 707/102 |
| 5,640,534 A * | 6/1997 | Liu et al. | ..................... | 711/146 |
| 5,650,941 A * | 7/1997 | Coelho et al. | ................ | 345/619 |
| 5,655,117 A * | 8/1997 | Goldberg et al. | ............ | 707/102 |
| 5,771,379 A * | 6/1998 | Gore, Jr. | ..................... | 707/101 |
| 5,832,495 A * | 11/1998 | Gustman | ..................... | 707/102 |
| 5,903,892 A * | 5/1999 | Hoffert et al. | .................. | 707/10 |
| 5,956,729 A * | 9/1999 | Goetz et al. | ............. | 707/104.1 |
| 6,032,156 A * | 2/2000 | Marcus | ..................... | 707/104.1 |
| 6,154,754 A * | 11/2000 | Hsu et al. | ..................... | 715/210 |
| 6,438,594 B1 * | 8/2002 | Bowman-Amuah | ......... | 709/225 |
| 6,573,907 B1 * | 6/2003 | Madrane | ..................... | 715/719 |
| 6,895,407 B2 * | 5/2005 | Romer et al. | ............. | 707/104.1 |
| 7,432,940 B2 * | 10/2008 | Brook et al. | ................. | 345/629 |

FOREIGN PATENT DOCUMENTS

JP 2006217045 A * 8/2006

* cited by examiner

*Primary Examiner*—Shahid A Alam
(74) *Attorney, Agent, or Firm*—Seyfarth Shaw, LLP

(57) ABSTRACT

Methods and systems for indexing video files, the method comprising selecting and loading a video into a video editing program, segmenting the video into short clips and creating an edit decision list (EDL) containing information corresponding to the short clips, importing the video and EDL, parsing the EDL, and automatically populating a database with names of the short clips and corresponding EDL information, and cataloging the video by establishing specific identifiers associated with the video, transcribing audio from each of the short clips and associating the transcribed audio with the respective short clip, associating visual identifiers with each short clip, extracting metadata from each short clip and associating the metadata with the respective short clip, storing the transcribed audio, visual identifiers, and metadata in the database, and indexing the database according to the specific identifiers.

26 Claims, 43 Drawing Sheets

EDL Import

Media Access System

Home / Features / Friends      New Episode   New Scene   Logout

Actions   Actors   Characters   CMS   Episodes   Locations   Reels   Seasons   Subjects Friends - Friends - CMS Settings

Friends

- ☒ CMS Settings
- ☒ Search Definitions
- ☒ Advertising
- ☒ ClipBin
- ☒ Episodes
- ☒ Help
- ☒ Login
- ☒ Main
- ☒ Publicity
- ☒ Search

New Layout

Select Scene EDL File

Reel: [Select Film Reel ▼] ~838
New Reel: [ ] ~840
Prefix: [ ] ~842
EDL File: [ ] [Browse...] ~844, ~846

[Cancel] [Import]
~848    ~850

Home | My Features | Demo | Logout |

FIG. 2a

Media Import and Assignment

Media Access System

Home / Features / Friends     New Episode   New Scene   Logout
Actions  Actors  Characters  CMS  Episodes  Locations  Reels  Seasons  Subjects
Friends - Friends - CMS Settings

Friends

- ☑ CMS Settings
- ☑ Search Definitions
- ☑ Advertising
- ☑ ClipBin   858
- ☑ Episodes   868
- ☑ Help
- ☑ Login
- ☑ Main   870
- ☑ Publicity
- ☑ Search
- New Layout

Import Guest Star Reel 5 Media Only   862   [Bind Import]
\friends\FriendsGuestReel5 LGcompression
[Browse...] [Preview] [Upload] [Assign]

| Ep. | ID | Scene |
|---|---|---|
| 195 | 001 | 05:00:00:00 - 05:00:08:20 — 860<br>Jack is ready to meet Emma   864   866 |

☑ 195-001.mov

| 195 | 002 | 05:00:09:20 - 05:00:28:18<br>Everyone is standing around looking at baby Emma |
|---|---|---|

☐ File Assignment

| 195 | 003 | 05:00:29:18 - 05:00:39:08<br>Jack thinks he hears someone having sex |
|---|---|---|

☐ File Assignment

| 195 | 004 | 05:00:40:08 - 05:00:50:24<br>Jack catches Chandler and Monica having sex |
|---|---|---|

☑ 195-004.mov

| 195 | 005 | 05:00:51:24 - 05:00:58:26<br>The nurse is helping Rachel |
|---|---|---|

☑ 195-005.mov

| 195 | 006 | 05:00:59:26 - 05:01:07:23<br>Jack is excited to hear Monica is trying to get pregnant |
|---|---|---|

☑ 195-006.mov

| 195 | 007 | 05:01:08:23 - 05:01:18:17<br>Jack is giving Chandler and Monica sex advice |
|---|---|---|

☑ 195-007.mov

| 195 | 008 | 05:01:28:17 - 05:01:38:29<br>Baby Emma won't stop crying |
|---|---|---|

☐ File Assignment

| 195 | 009 | 05:01:39:29 - 05:02:03:10<br>Ms. McKenna is sending Chandler to work in Tulsa |
|---|---|---|

☐ File Assignment

| 195 | 010 | 05:02:04:10 - 05:02:14:04<br>Gunther can't believe Rachel had Ross' baby |
|---|---|---|

☐ File Assignment

| 195 | 011 | 05:02:36:08 - 05:02:55:20<br>Joey finds a Mike for Phoebe |
|---|---|---|

☐ File Assignment

| 195 | 012 | 05:00:29:18 - 05:00:39:08<br>Ross is caught in a lie |
|---|---|---|

*FRIENDS*

Episode
[No Filter] — 878
Season
[No Filter] — 880
Reel
[ ] — 882
Scene ID
[ ] — 884

FIG. 2b

Sub Account Management

Media Access System

Accounts / Digitalsmiths Corporation / Test Account / New Sub Account     Logout

Home
- My Account
- My Features
- About Us
- Our Clients
- Help
- Contact Us
- Log Out

Logout

Account Information

Company: Digitalsmiths Corporation
First Name: [Test]
Last Name: [Account]
Address: 917 Bay Street
City: Beaufort
State: SC
Country: US
Postal Code: 29902
Phone: [(843) 379-7878]
Fax: [ ]
Email: [support@digitalsmiths.com]

[Update] [Cancel]

Login: [ ]
Password: [ ]
Confirm: [ ]

Management Functions
- Display Settings
- Account Permissions
- Feature Permissions ← 122

[Close Account] [Remove]

Home | My Features | Demo | Logout

Feature Episodes

Media Access System

Home / Features / Friends / Episodes      New Episode   New Scene   Logout

Actions   Actors   Characters   CMS   Episodes   Locations   Reels   Seasons   Subjects Friends (236 Episodes) ←—472     —476     478     —480

All Episodes     [Spell Check] [Update]

| Ep. | Sn. | Title | Reel | Scenes |
|---|---|---|---|---|
| 1 | 1 | Pilot | Season 1 Reel 1 | (45) |
| 2 | 1 | The One With The Sonogram | Season 1 Reel 1 | (34) |
| 3 | 1 | The One With The Thumb | Season 1 Reel 1 | (41) |
| 4 | 1 | The One With The George Stephanopolous | Season 1 Reel 1 | (49) |
| 5 | 1 | The One With The East German Laundry De | Season 1 Reel 1 | (40) |
| 6 | 1 | The One With The Butt | Season 1 Reel 1 | (49) |
| 7 | 1 | The One With The Blackout | Season 1 Reel 1 | (41) |
| 8 | 1 | The One Where Nana Dies Twice | Season 1 Reel 1 | (37) |
| 9 | 1 | The One Where Underdog Gets Away | Season 1 Reel 2 | (45) |
| 10 | 1 | The One With The Monkey | Season 1 Reel 2 | (41) |
| 11 | 1 | The One With Mrs. Bing | Season 1 Reel 2 | (31) |
| 12 | 1 | The One With The Dozen Lasagnas | Season 1 Reel 2 | (40) |
| 13 | 1 | The One With The Boobies | Season 1 Reel 2 | (38) |
| 14 | 1 | The One With The Candy Hearts | Season 1 Reel 2 | (35) |
| 15 | 1 | The One With The Stoned Guy | Season 1 Reel 2 | (52) |
| 16 | 1 | The One With 2 Parts, Part 1 | Season 1 Reel 2 | (35) |
| 17 | 1 | The One With 2 Parts, Part 2 | Season 1 Reel 2 | (44) |
| 18 | 1 | The One With All The Poker | Season 1 Reel 3 | (47) |
| 19 | 1 | The One With The monkey Gets Away | Season 1 Reel 3 | (60) |
| 20 | 1 | The One With The Evil Orthodontist | Season 1 Reel 3 | (44) |

1 | 2 | 3 | 4 | 5 | 6 | 7 | 8 | 9 | 10 | 11 | 12 |     Next >>

Home | My Features | Demo | Logout |

FIG. 18

Episode Import

Episode Management

Media Access System

Home / Features / Friends / Episodes     New Episode   New Scene   Logout

Actions Actors Characters CMS Episodes Locations Reels Seasons Subjects

Friends (Pilot – 44 Scenes) ◄— 932

---

Episode 1 - Pilot ╱—934    ╱—936

Episode: [1]   Title: [Pilot]     ╱—942    Season: [1 ▼] 938   962

Reel: [Season 1 Reel 1 ▼]   Production: [475085]   Rating: [ ] —944

Aired: [ ]   Synopsis: [ ]

946    940    948          960   964

| | | |
|---|---|---|
| Next Episode | Spell Check | Update |

950 — ◄► 44 Episode Scenes     Next >>

| ☐ | 001 | Monica Tells Joey About Her Date.<br>01:00:00:00 - 01:00:08:03 |
|---|---|---|
| ☐ | 001  — 954 | Monica introduces Paul.<br>01:00:00:00 - 01:00:12:24 |
| ☑ | 002 | Monica Says He's Not Going On A Date.<br>01:00:09:03 - 01:00:16:20 |
| ☐ | 002 | Monica is having dinner with Paul.<br>01:00:13:24 - 01:00:25:05 |
| ☐ | 003 | Ross Says Hi.<br>01:00:17:20 - 01:00:24:21 |
| ☐ | 004 | Ross Says He's Not Feeling Well.<br>01:00:25:21 - 01:00:35:00 |
| ☐ | 005 | Phoebe Cleanses Ross Aura.<br>01:00:36:00 - 01:00:42:01 |
| ☐ | 006 | Ross Says He'll Be Fine.<br>01:00:43:01 - 01:00:56:05 |
| ☐ | 007 | Chandler Wishes He Was a Lesbian.<br>01:00:57:01 - 01:01:05:08 |
| ☐ | 008 | Joey Has An Answer For Ross's Pain.<br>01:01:06:08 - 01:01:18:26 |
| ☐ | 009 | Ross Says He Doesn't Want To Be Single.<br>01:01:19:26 - 01:01:33:12 |
| ☐ | 010 | Rachel Says She Was Looking For Monica.<br>01:01:34:12 - 01:01:44:20 |
| ☐ | 011 | Monica Introduces Rachel To Everybody.<br>01:01:45:20 - 01:02:03:04 |
| ☐ | 012 | Rachel Explains Why She's Not At Her Wedding.<br>01:02:04:04 - 01:02:31:03 |
| ☐ | 013 | Rachel Says She Didn't Know Where To Go.<br>01:02:32:03 - 01:02:45:26 |

952

[Move Selected Scenes ▼] ⊙— 958

956

Home | My Features | Demo | Logout |

FIG. 20

Filtered Scenes Listing

```
                    Media Access System

Home / Features / Friends                      New Episode  New Scene  Logout
Actions  Actors  Characters  CMS  Episodes  Locations  Reels  Seasons  Subjects
Episode 66 – Friends (13 Scenes) ← 552                         564
─────────────────────────────────────────────────────────────────────────
       Ep.   ID    Scene                                              ◇
554    66   087   02:18:25:21 - 02:18:32:20                           ⊗
                  Frank Jr. introduces his fiance.           562
       66   088   02:18:33:20 - 02:18:44:21                           ⊗
                  Frank and Ms. Knight kiss.
556    66   089   02:18:45:21 - 02:18:46:09 ← 560                     ⊗
                  Frank and Ms. Knight want kids.
       66   090   02:18:51:09 - 02:19:00:29                           ⊗
                  Age doesn't matter.
558    84   196   02:41:09:28 - 02:41:15:20                           ⊗
                  Frank, Jr. is married.
       84   197   02:41:16:20 - 02:41:26:10                           ⊗
                  Alice and Frank want a baby
       84   198   02:41:27:10 - 02:41:45:19                           ⊗
                  Frank needs a favor.
       84   201   02:42:08:15 - 02:42:17:10                           ⊗
                  Phoebe says yes.
       85   203   02:42:40:24 - 02:42:51:20                           ⊗
                  It's Phoebe's uterus.
       85   204   02:42:52:20 - 02:43:14:09                           ⊗
                  Phoebe is pregnant.
       90   230   02:48:45:00 - 02:49:01:22                           ⊗
                  Phoebe tells Alice and Frank the good news.
       91   235   02:49:57:20 - 02:50:08:24                           ⊗
                  Phoebe names the other baby boy.
       100  013   03:02:52:25 - 03:02:59:21                           ⊗
                  Alice and Frank hug each other.
                                    1

Home | My Features | Demo | Logout |
```

FIG. 23

Feature Scene

Media Access System

Home / Features / Friends        New Episode   New Scene   Logout
Actions   Actors   Characters   CMS   Episodes   Locations   Reels   Seasons   Subjects Episode - (13 Scenes)     630     632

| 610 | 612 | 614 | 616 | 618 | | | |
|---|---|---|---|---|---|---|---|
| 66 | 02:18:25:21-02:18:32:20 | | Clip ID: 087 | | 622 626 | 620 ⊗ | |
| 66 | 02:18:33:20-02:18:44:21 | | Clip Name: Frank Jr. introduces his fiance | | | | |
| 66 | 02:18:45:21-02:18:50:09 | | 628 Episode: 66 - The One With The Hypnosis Tape   644   624 | | | | |
| 66 | 02:18:51:09-02:19:00:29 | | 636 Time In: 02 18 25 214 634   Setting: Interior   646 | | | | |
| 84 | 02:41:09:28-02:41:15:20 | | Time Out: 02 18 32 20   Duration: 00:00:07:29   [Update] | | | | |
| 84 | 02:41:16:20-02:41:26:10 | | Characters (Major) 638   640   642 | | | 648 | |
| 84 | 02:41:27:10-02:41:45:19 | | ☐ Chandler Bing   ☐ Joey Tribbiani   ☐ Monica Geller   ☐ Phoebe Buffay | | | | |
| 84 | 02:42:08:15-02:42:17:10 | | (Mathew Perry)   (Matt Leblanc)   (Courtney Cox)   (Lisa Kudrow) | | | | |
| 85 | 02:42:40:24-02:42:51:20 | | ☐ Rachel Green   ☐ Ross Geller   ☐ Ursula Buffay   652   650 | | | | |
| 85 | 02:42:52:20-02:43:14:09 | | (Jennifer Aniston)   (David Schwimmer)   (Lisa Kudrow) | | | | |
| 90 | 02:48:45:00-02:49:01:22 | | Characters (Minor) | | | 654 | |
| 91 | 02:49:57:20-02:50:08:24 | | Locations | | | 656 | |
| 100 | 03:02:52:25-03:02:59:21 | | Actions | | | 658 | |
| | | | Subjects | | | 660 | |
| | | | Scene / Description | | | 662 | |

608

Frank walks over and gets his fiance and bring her over to meet everyone.

Script      664

Frank: "This is uh, my fiance Ms. Knight."

666

Keywords

[Spell Check] [Update]
668     670

Home | My Features | Demo | Logout |

FIG. 26

Figure 29A:
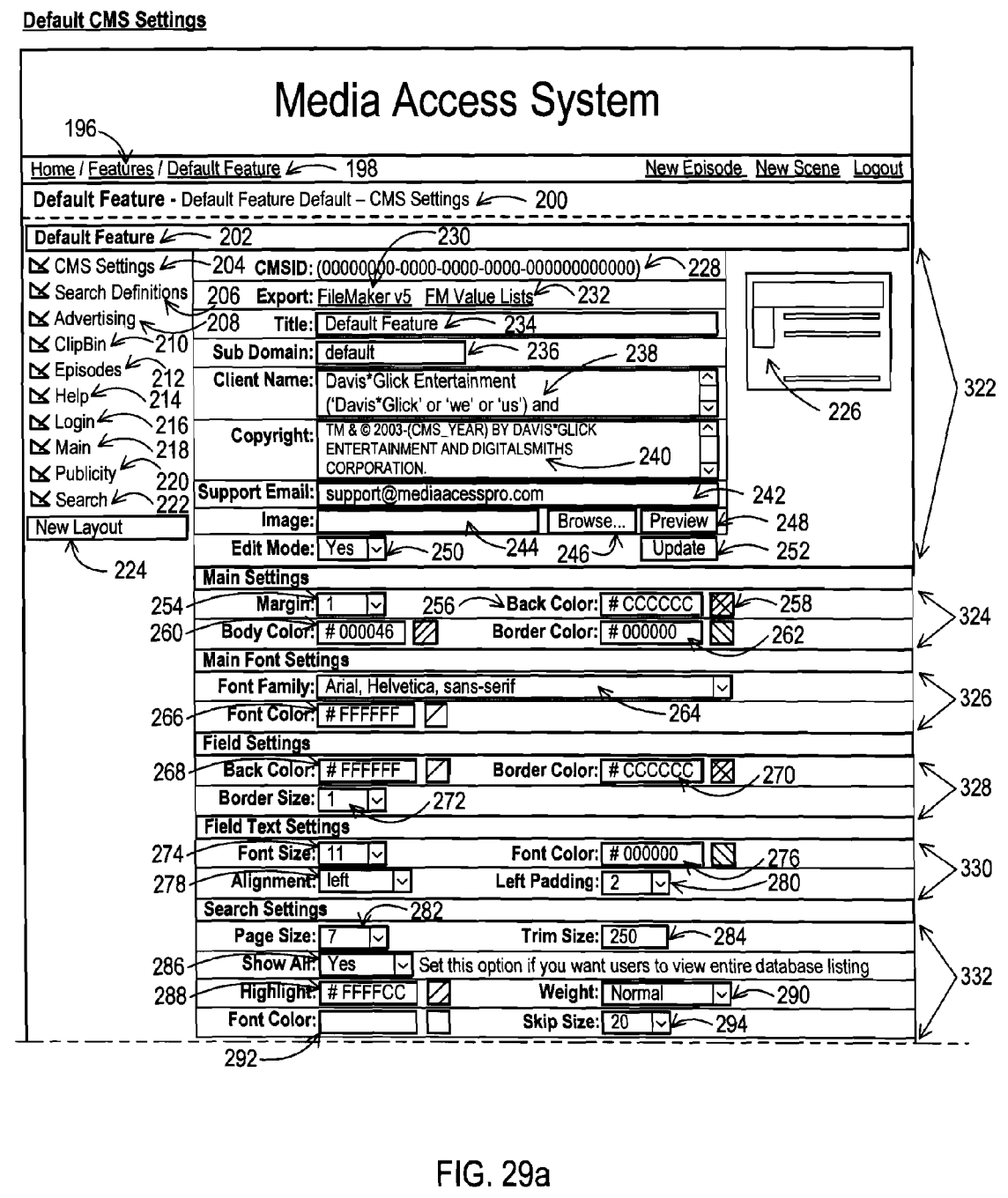

Default CMS Settings

Media Access System

196

Home / Features / Default Feature ← 198     New Episode   New Scene   Logout

Default Feature - Default Feature Default – CMS Settings ← 200

| Default Feature ← 202 | 230 | |
|---|---|---|
| ☒ CMS Settings ← 204 | CMSID: (00000000-0000-0000-0000-000000000000) ← 228 | |
| ☒ Search Definitions 206 | Export: FileMaker v5   FM Value Lists ← 232 | |
| ☒ Advertising 208 | Title: Default Feature ← 234 | |
| ☒ ClipBin ← 210 | Sub Domain: default ← 236   238 | |
| ☒ Episodes ← 212 | Client Name: Davis*Glick Entertainment ('Davis*Glick' or 'we' or 'us') and | 226 |
| ☒ Help ← 214 | | |
| ☒ Login ← 216 | Copyright: TM & © 2003-(CMS_YEAR) BY DAVIS*GLICK ENTERTAINMENT AND DIGITALSMITHS CORPORATION. ← 240 | |
| ☒ Main ← 218 | | |
| ☒ Publicity ← 220 | | |
| ☒ Search ← 222 | Support Email: support@mediaacesspro.com ← 242 | |
| New Layout | Image:    Browse...   Preview ← 248 | |
| ← 224 | Edit Mode: Yes ▼ ← 250   244   246   Update ← 252 | |

Main Settings 322

254 — Margin: 1 ▼   256 — Back Color: #CCCCCC ☒ — 258
260 — Body Color: #000046 ☒   Border Color: #000000 ☒ ,262     324

Main Font Settings
Font Family: Arial, Helvetica, sans-serif ▼
266 — Font Color: #FFFFFF ☒ — 264     326

Field Settings
268 — Back Color: #FFFFFF ☒   Border Color: #CCCCCC ☒ ,270
Border Size: 1 ▼ ,272     328

Field Text Settings
274 — Font Size: 11 ▼   Font Color: #000000 ☒ ,276
278 — Alignment: left ▼   Left Padding: 2 ▼ — 280     330

Search Settings ← 282
Page Size: 7 ▼   Trim Size: 250 ← 284
286 — Show All: Yes ▼   Set this option if you want users to view entire database listing     332
288 — Highlight: #FFFFCC ☒   Weight: Normal ▼ — 290
Font Color:   Skip Size: 20 ▼ — 294
292 —

Feature CMS

Media Access System

Home / Features / Friends      New Episode   New Scene   Logout
Actions  Actors  Characters  CMS  Episodes  Locations  Reels  Seasons  Subjects
Friends - Friends – CMS Settings

Friends

- 680 — CMS Settings
- 682 — Search Definitions
- 684 — Advertising, ClipBin, Episodes, Help, Login, Main, Publicity, Search
- 686 — New Layout

| Field | Value |
|---|---|
| CMSID: | (1A16E7C5-80E4-4552-A6E1-9A435840BD07) |
| Export: | FileMaker v5   FM Value Lists |
| Title: | Friends |
| Sub Domain: | friends |
| Client Name: | Warner Brothers Entertainment |
| Copyright: | Warner Brothers Entertainment |
| Support Email: | support@mediaacesspro.com |
| Image: | [ Browse... ] [ Preview ] |
| Require Login: | ☑ Manage Users ← 904 |
| Edit Mode: | Yes   [Update] |

902 (Require Login)
688 — FRIENDS preview

Main Settings
Margin: 1    Back Color: # 000000
Body Color: # 000046    Border Color: # 000000

Main Font Settings
Font Family: Arial, Helvetica, sans-serif
Font Color: # FFFFFF

Field Settings
Back Color: # FFFFFF    Border Color: # CCCCCC
Border Size: 1

Field Text Settings
Font Size: 11    Font Color: # CCCCCC
Alignment: left    Left Padding: 2

Search Settings
Page Size: 7    Trim Size: 250
Show All: Yes    Set this option if you want users to view entire database listing

FIG. 30

CMS Search Definitions

Media Access System

Home / Features / Friends     New Episode   New Scene   Logout

Actions   Actors   Characters   CMS   Episodes   Locations   Reels   Seasons   Subjects

Friends - Friends CMS – CMS Settings

Friends

- ☒ CMS Settings
- ☒ Search Definitions
- ☒ Advertising
- ☒ ClipBin
- ☒ Episodes
- ☒ Help
- ☒ Login
- ☒ Main
- ☒ Publicity
- ☒ Search New Layout

| Search Definitions | |
|---|---|
| Chandler Search | Remove |
| Couples Search | Remove |
| Group Search ← 690    692 → | Remove |
| Joey Search | Remove |
| Monica Search | Remove |
| Phoebe Search | Remove |
| Rachel Search | Remove |
| Ross Search | Remove |
| | New Definition ← 694 |

*FRIENDS*

Home | My Features | Demo | Logout |

FIG. 32

CMS Search Definitions Details

```
┌─────────────────────────────────────────────────────────────────────┐
│                     Media Access System                             │
├─────────────────────────────────────────────────────────────────────┤
│ Home / Features / Friends              New Episode  New Scene  Logout│
│ Actions Actors Characters CMS Episodes Locations Reels Seasons Subjects│
│ Friends - Friends CMS – CMS Settings                                │
│ ─────────────────────────────────────────────────────────────────── │
│ Friends                                                             │
│ ⊠ CMS Settings    │ Search Definitions                              │
│ ⊠ Search Definitions│ Type: ○ Check  ○ Radio  ⊙ Text ←—696          │
│ ⊠ Advertising     │ Title: [ Chandler Search ←—698 ]                │
│ ⊠ ClipBin         │ Label: [ ←—700              704 ]               │
│ ⊠ Episodes        │ Image: [ ←—702          ] [ Browse... ]  chandler clips│
│ ⊠ Help            │ Criteria: Characters ←—706   708 ↘ remove       │
│ ⊠ Login           │ Add Criteria                                    │
│ ⊠ Main            │ Type: ⊙ AND  ○ OR ↖710                          │
│ ⊠ Publicity       │ Field: [• Characters           ▼] ↖712          │
│ ⊠ Search          │        ┌─────────────────────────┐              │
│ ┌──────────┐      │        │ 0                     ▲ │              │
│ │New Layout│      │        │ Alice Knight            │              │
│ └──────────┘      │ Value: │ Amanda ←—714            │              │
│                   │        │ Amy Green               │              │
│                   │        │ Barry                   │              │
│                   │        │ Ben                     │              │
│                   │        │ Betsy Hanigan         ▼ │              │
│                   │        └─────────────────────────┘              │
│                   │ Multiple: ○ AND  ⊙ OR ↖716                      │
│                   │ 718 ↙  ┌─────────────────────────┐              │
│                   │ Note:  │                       ▲ │              │
│                   │        │                         │              │
│                   │        │                         │              │
│                   │        │                    720 ▼ │             │
│                   │        └─────────────────────────┘              │
│                   │                    [ Update Definition ]         │
├─────────────────────────────────────────────────────────────────────┤
│                  Home | My Features | Demo | Logout |               │
└─────────────────────────────────────────────────────────────────────┘
```

FIG. 33

CMS Layer

Media Access System

Home / Features / Friends     New Episode   New Scene   Logout

Actions   Actors   Characters   CMS   Episodes   Locations   Reels   Seasons   Subjects Friends - Friends CMS - CMS - Episodes     — 768

Friends    — 770

- ☒ CMS Settings
- ☒ Search Definitions
- ☒ Advertising
- ☒ ClipBin
- ☒ Episodes
- ☒ Help
- ☒ Login
- ☒ Main
- ☒ Publicity
- ☒ Search

| Field | Value |
|---|---|
| Layer ID: | {6B5B800A-ED48-48AF-B8E0-5F8ACFD3A4AC} |
| Name: | Goto Advertising Layout — 772 |
| Type: | Action — 774   Update — 776 |
| Index: | 0 — 778   780 |
| Text / Label: | |
| 782 — Top: | 203   Left: 0 — 784 |
| 786 — Height: | 20   Width: 105 — 788 |
| Script / Link: | javascript:self.submitForm('[LAYOUT_ADVERTISING]','') — 790 |
| Target: | — 792   794 |
| Help Text: | |
| 796 — Font Size: | Default   Weight: Default — 798 |
| 800 — Font Color: | default   Align: Default — 802 |
| Back Color: | default — 804   806 |
| Image Upload: | Browse... — 808 |
| Image Type: | GIF,JPG,JPEG,BMP,PNG — 810 |

CMS Constraints and Values

| | |
|---|---|
| CMS_TITLE | Title of CMS Application |
| CMS_SUBDOMAIN | Sub Domain of CMS Applications |
| CMS_PAGE | Current Page Number |
| CMS_PAGES | Total Number of Pages |
| CMS_RECORD | Current Record Number |
| CMS_RECORDS | Total Number of Records |

832

Update

Home | My Features | Demo | Logout |

FIG. 35

CMS New Layer

Media Access System

Home / Features / Friends      New Episode   New Scene   Logout
Actions  Actors  Characters  CMS  Episodes  Locations  Reels  Seasons  Subjects

Friends - Friends CMS - CMS - Login

Friends

- ☒ CMS Settings
- ☒ Search Definitions
- ☒ Advertising
- ☒ ClipBin
- ☒ Episodes
- ☒ Help
- ☒ Login
- ☒ Main
- ☒ Publicity
- ☒ Search

*FRIENDS*

Field Name — 814
- Name: [ ]

New Login Layer — 816
- ⦿ Defined: [ ▼ ]

Defined Search Link — 818
- ○ Search: [ ▼ ]

Goto Layout — 820
- ○ Layout: [ ▼ ]
- Label: [ ] — 822

Link
- ○ Link: [ ] — 824
- Label: [ ] — 826

Text Label / Image
- ○ Label: [ ] — 828

In Line Frame
- ○ URL: [ ] — 830

836 — [Cancel] [Add Layer] — 834

| | |
|---|---|
| CMS_TITLE | Title of CMS Application |
| CMS_SUBDOMAIN | Sub Domain of CMS Applications |
| CMS_PAGE | Current Page Number |
| CMS_PAGES | Total Number of Pages |
| CMS_RECORD | Current Record Number |
| CMS_RECORDS | Total Number of Records |

832

Home | My Features | Demo | Logout |

FIG. 36

MEDIA ACCESS SYSTEM

CROSS-REFERENCE TO RELATED APPLICATIONS

This application claims priority under 35 U.S.C. § 119 to U.S. Provisional Patent Application No. 60/788,992, entitled "Improved Media Access System," filed Apr. 3, 2006, which is incorporated herein by reference in its entirety.

TECHNICAL FIELD

The present invention relates generally to video files, and specifically to indexing video files based on specific identifiers. This invention also relates to designing a front-end display and publishing to this front-end display the video-related information based on the indexing of the video files.

BACKGROUND

Systems often referred to as "front-end applications" have been created to allow users to search and retrieve video-related information based on certain identifiers, indexes, and/or search criteria. An example of such a front-end application is the one described in Published Patent Application US 2004/0237101, which is incorporated herein by reference. The video-related information used by the front-end application, including the identifiers, indexes, etc., must be entered into the system and associated with the relevant scenes of the video. Generally, these identifiers are manually entered and associated to the video's scenes. Automation of this process would free up a substantial amount of man-hours.

SUMMARY

The present invention provides systems and methods for indexing video files based on specific identifiers. One embodiment provides for indexing video files, the method comprising selecting and loading a video into a video editing program, segmenting the video into short clips and creating an edit decision list (EDL) containing information corresponding to the short clips, importing the video and EDL, parsing the EDL, and automatically populating a database with names of the short clips and corresponding EDL information, and cataloging the video by establishing specific identifiers associated with the video, transcribing audio from each of the short clips and associating the transcribed audio with the respective short clip, associating visual identifiers with each short clip, extracting metadata from each short clip and associating the metadata with the respective short clip, storing the transcribed audio, visual identifiers, and metadata in the database, and indexing the database according to the specific identifiers.

Another embodiment provides for indexing video files, the method comprising, selecting and loading a video into a video editing program, segmenting the video into short clips and creating an edit decision list (EDL) containing information corresponding to the short clips, importing the video and EDL, parsing the EDL, and automatically populating a database with names of the short clips and corresponding EDL information, and cataloging the video by establishing specific identifiers associated with the video, storing the specific identifiers in the database, storing the association between the specific identifiers and the video in the database, and indexing the database according to the specific identifiers.

Another embodiment provides media access system for indexing video files, the media access system comprising, a video editing program configured for segmenting a video into short clips and creating an edit decision list (EDL), a storage medium configured for containing an EDL, at least one database configured for receiving names of short clips and corresponding EDL information, and specific identifiers associated with the video, and a module for cataloging the video, the module configured for establishing the specific identifiers and indexing the database according to the specific identifiers.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 2a is a schematic representation of a web interface component of an improved media access system in accordance with an embodiment of the present invention.

FIG. 2b is a schematic representation of a web interface component of an improved media access system in accordance with an embodiment of the present invention

FIG. 8 is a schematic representation of a web interface component of an improved media access system in accordance with an embodiment of the present invention.

FIG. 9 is a schematic representation of a web interface component of an improved media access system in accordance with an embodiment of the present invention.

FIG. 18 is a schematic representation of a web interface component of an improved media access system in accordance with an embodiment of the present invention.

FIG. 20 is a schematic representation of a web interface component of an improved media access system in accordance with an embodiment of the present invention.

FIG. 23 is a schematic representation of a web interface component of an improved media access system in accordance with an embodiment of the present invention.

FIG. 26 is a schematic representation of a web interface component of an improved media access system in accordance with an embodiment of the present invention.

FIG. 29 is a schematic representation of a web interface component of an improved media access system in accordance with an embodiment of the present invention.

FIG. 30 is a schematic representation of a web interface component of an improved media access system in accordance with an embodiment of the present invention.

FIG. 32 is a schematic representation of a web interface component of an improved media access system in accordance with an embodiment of the present invention.

FIG. 33 is a schematic representation of a web interface component of an improved media access system in accordance with an embodiment of the present invention.

FIG. 35 is a schematic representation of a web interface component of an improved media access system in accordance with an embodiment of the present invention.

FIG. 36 is a schematic representation of a web interface component of an improved media access system in accordance with an embodiment of the present invention.

DETAILED DESCRIPTION

Figure 1:
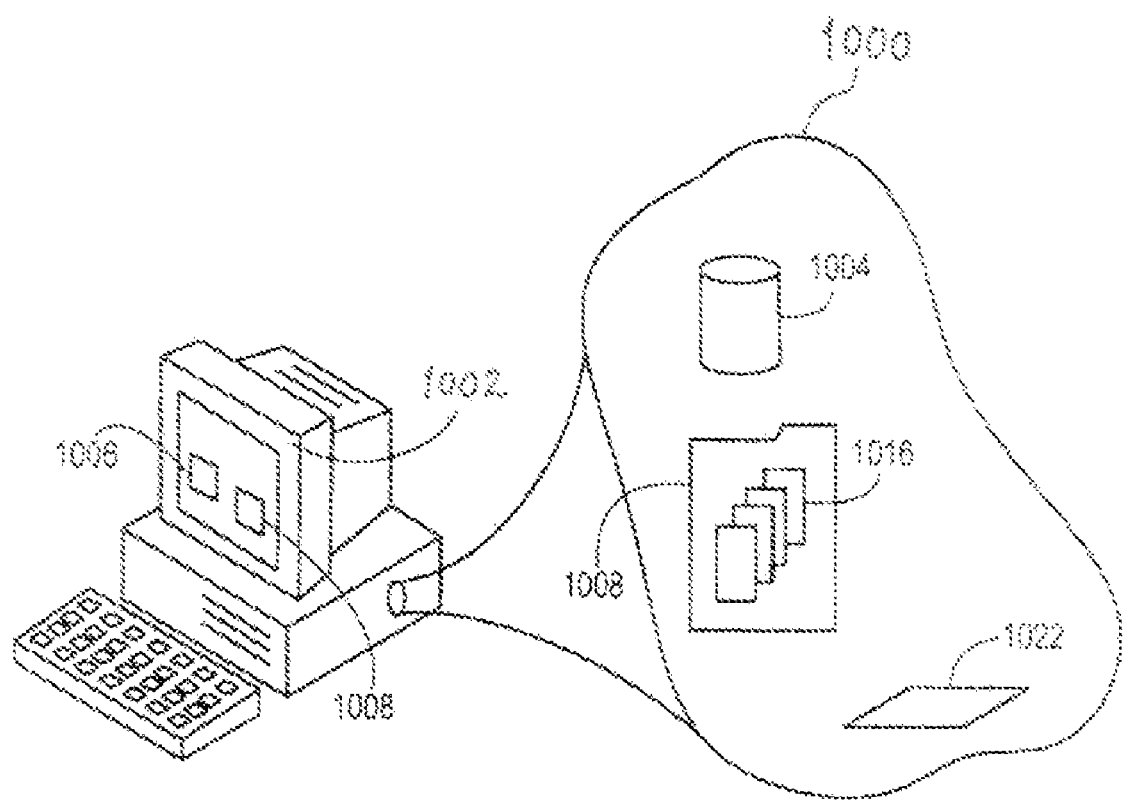
FIG. 1 is a schematic representation of an improved media access system in accordance with an embodiment of the present invention.

Reference is now made in detail to the description of the embodiments as illustrated in the drawings. The invention may, however, be embodied in many different forms and should not be construed as limited to the embodiments set forth herein; rather, these embodiments are intended to convey the general scope of the invention to those skilled in the art. Furthermore, all "examples" given herein are intended to be non-limiting.

The present invention provides systems and methods for indexing video files based on specific identifiers. This invention also relates to designing a front-end display and publishing to this front-end display the video-related information based on the indexing of the video files.

Referring to FIG. 1, an improved media access system 1000 is stored on at least one computer 1002. System 1000 contains at least one database 1004, a video editing program 1006, and other storage medium such as folder 1008.

Figure 2:
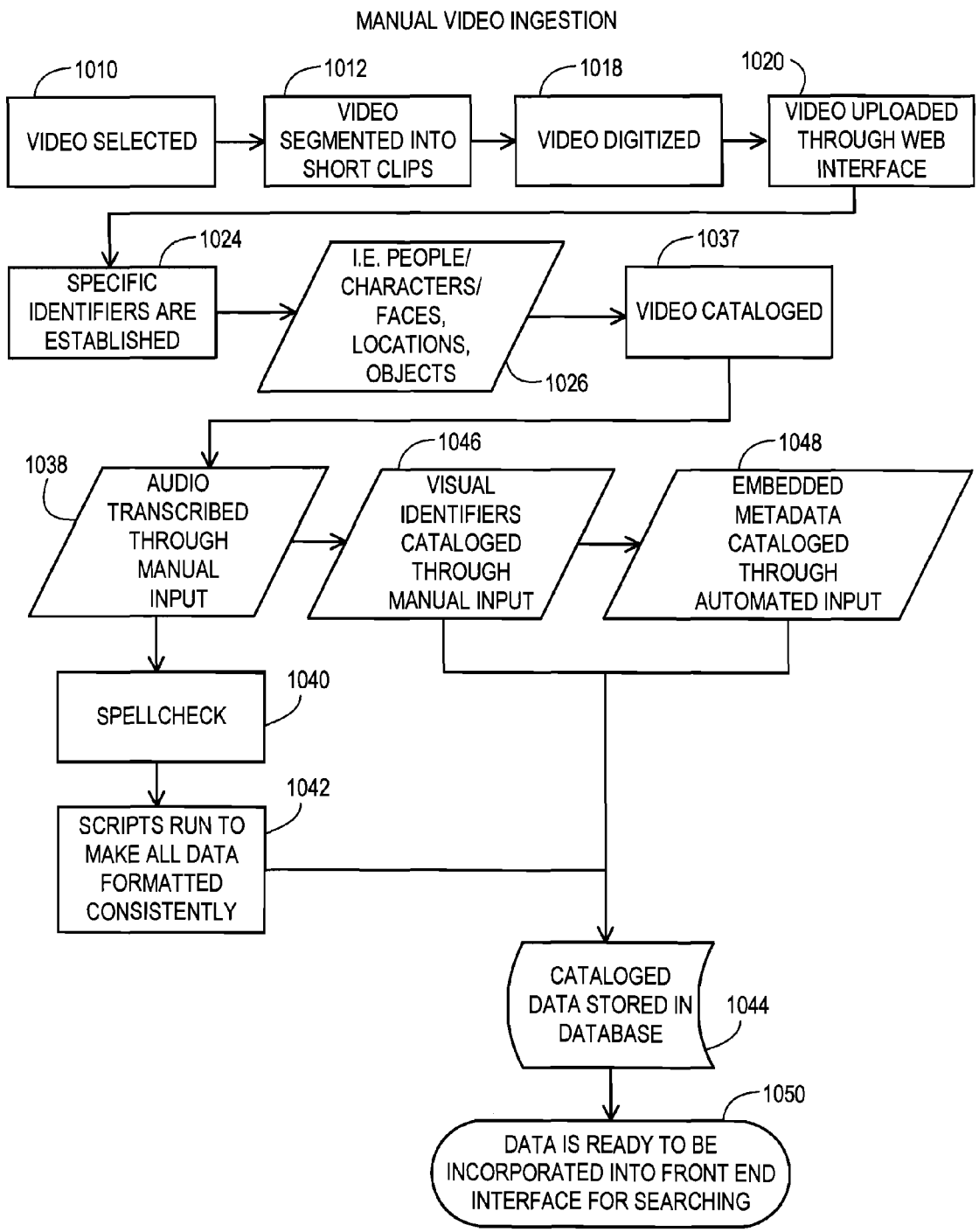
FIG. 2 is a flowchart of a method of an improved media access system in accordance with an embodiment of the present invention.

FIG. 2 is a flowchart that schematically illustrates a method for indexing video files of a specific television or movie feature based on specific identifiers using system 1000. The method is described generally herewith respect to FIG. 1 and FIG. 2 to aid understanding and in more detail below with respect to FIG. 2a through FIG. 26. Referring to FIG. 1 and FIG. 2, at a video selection step 1010, the video to be indexed is selected by the users. The video selected at step 1010 is then loaded into video editing program 1008 at video segmentation step 1012. At step 1012, video editing program 1008 segments the video into short clips (smaller files) and creates an edit decision list ("EDL") 1016. EDL 1016 is stored in folder 1008 and contains relevant information connecting the video file to the smaller video clips including time codes, season numbers, episode numbers, etc. EDLs, as well as video editing programs that divide a video file into smaller video files and creates an associated EDL, should be understood by one skilled in the art and are, therefore, not explained in further detail. An example of video editing program 1008 is ADOBE PREMIER by Adobe Systems Incorporated located in San Jose, Calif.

If the video is in an analog or other non-digital format, i.e., it is stored on magnetic tape, film, etc., it is converted into digital format at step 1018. Video digitalization (step 1018) should be understood by those of skill in the art and is, therefore, not explained in further detail.

At step 1020, the video is uploaded through the web interface of system 1000. Other aspects of the web interface are discussed in detail below. At the same time, a script 1022 on system 1000 parses EDL 1016 and automatically populates database 1004 with all the names of the smaller video files as well as the corresponding information contained in EDL 1016 related to each smaller clip. Database entry and population should be understood by those skilled in the art.

At steps 1024 and 1026, specific identifiers by which the video will be indexed and cataloged are established. Examples of specific identifiers that may appear in the selected video include actions, locations, air dates, subject matter, actors, persons, characters, objects, etc., but can include anything with which a user may want to associate a video file or a part of a video file. It should be evident that the step of establishing the specific identifiers can be performed at any point prior to indexing and cataloging the video as described in more detail below. In other words, steps 1024 and 1026 do not need to be performed after, but can be performed prior to, uploading the video and populating database 1004 as described above.

The video is cataloged at steps 1037 through 1050, which are explained at this point at a high-level of detail with reference to FIG. 1 and FIG. 2, but will be explained in greater detail below with respect to FIG. 3 through FIG. 26. At step 1038, users transcribe the audio, including any dialogue, from each of the smaller clips created at step 1014. System 1000 checks the transcript for spelling errors 1000 at step 1040 and ensures all the information is formatted correctly at step 1042 and stores the information in database 1004 at step 1044. Users then store both the transcription and the association between the transcription and the smaller clips in database 1004 at step 1044.

At step 1046, users watch each smaller clip and associate any visual identifiers appearing within the clip. Users store the association between the identifier and the clip in database 1004 at step 1044.

As should be known by those skilled in the art, other information is embedded in digital video clips commonly referred to as metadata. Metadata should also be understood by those skilled in the art and is, therefore, not discussed in further detail. System 1000 automatically extracts any metadata embedded within each smaller clip at step 1048 and catalogs it by storing an association between the metadata and the clip in database 1004 at step 1044.

At step 1050, all visual and audio information and identifiers, as well as any metadata, has been cataloged in database 1004, and the database is indexed by these identifiers. Data stored in database 1004 can be retrieved by selecting an identifier or any combination of identifiers from a front-end application as described below in greater detail.

As described above with reference to FIG. 1 and FIG. 2, FIG. 2a and FIG. 2b depict a portion of system 1000 that allows users to import an EDL and automatically populate database 1004 with the EDL, while FIG. 3 through FIG. 26 depict another portion of system 1000 that allows users to manually index and catalog a video associated to the EDL. The portion of system 1000 illustrated by FIG. 2a through FIG. 26 is available to users through a web interface, but it should be understood by those skilled in the art that this portion of system 1000 can just as easily be a standalone program as well and should not be limited to a web interface. Each figure illustrates a separate component of the web interface and provides users with the ability to associate and catalog the smaller video clips with audio text and visual identifiers. The web interface then stores these associations in database 1004, which can be searched by front-end programs as described above. These web interface components are active server pages ("ASPs") and created using hypertext markup language ("HTML"), forms, and scripts, which are preferably created using JavaScript® or Visual Basic® or similar script software programs. These technologies should be understood by those skilled in the art, who should also understand that, when reference is made to fields within a form, all types of fields of an HTML form and not just text fields should be included within the reference.

It should be understood by one skilled in the art that the web interface described below with reference to FIG. 2a through FIG. 26 can be executed from computer 1002, any other computers connected to computer 1002 by a network, or multiple computers connected to computer 1002. FIG. 2a through FIG. 25 illustrate how system 1000, its users, video files, and accounts are configured, managed, and maintained, as well as how the specific identifiers described above are created, managed, maintained, and stored in database 1004 (FIG. 1). FIG. 26 illustrates how these identifiers are then assigned to scenes of the applicable video and how these associations are stored in database 1004 (FIG. 1).

FIG. 2a illustrates a component of the web interface for importing an EDL as described above with respect to step 1020 (FIG. 2). A dropdown box 838 is used to associate a reel with the smaller video clips that will be imported via the EDL. A field 840 is used to enter a new reel name if there is not one to select from dropdown box 838. A prefix field 842 is used to specify a prefix that each smaller clip within the video should contain. This prefix will be used in conjunction with all scene identification numbers described below. A file location field 844 displays the file path where the EDL is stored. A browse button 846 is used to open a file browser window to search and select an EDL file to be imported. File location fields, such as field 844, browse buttons, such as button 846, and file browser windows should be known to those skilled in the art. Activation of a cancel button 848 cancels the EDL importation process. An import button 850 is used to process the EDL file listed in field 844 and associates all the clips with the specified reel. System 1000 parses the EDL 1016 (FIG. 1) to separate out all time codes and clip numbers, which are separated from extraneous prefixes.

FIG. 2b illustrates a component of the web interface used to associate the smaller video clips on a reel to scenes of the selected feature. A label 852 displays the title of the reel selected from a reel selection dropdown box 882. A blind import button 854 is used to import and assign the imported media to scenes based on the order in which the media files are stored in the import directory of folder 1008 (FIG. 1) and then orders the scenes in database 1004. The function provided by blind import button 854 is only available when the user filters scenes by reel by using dropdown box 882. A find dropdown box 856 lists import directory selections from folder 1008 (FIG. 1). A file path filed 858 lists the name and path of the selected media file. A browse button 860 opens a file browser window used to locate and select the media file from computer 1002. A preview button 862 is used to play the media file selected in field 858 in a separate popup window. An upload button 864 is used to upload the media file selected in field 858 and assign it to the selected scene. An assign button 866 is used to assign the media file listed in field 858 to the selected scene. Checkboxes, such as a media clip checkbox 868, are used to select which scenes should be processed and which have media assigned to them. Dropdown boxes, such as a media clip dropdown box 870, are used to select a media file from a list of media files in the import directory displayed in dropdown box 856. An image button 872 is displayed adjacent to dropdown box 870 if the selected scene has a media clip associated with it. Activating button 872 plays the associated media clip in a separate popup window. A delete button 874 is used to delete and unassign the currently assigned media clip from the selected scene. A section box 876 is used to filter the scene selections based on episode, season, reel, etc. An episode dropdown box 878 is used to filter the scenes by episode. A season dropdown box 880 is used to filter the scenes by season. Reel selection dropdown box 882 is used to filter the scenes by reel. A scene ID field (not labeled) is used to filter the scenes by a scene identifier.

Figure 3:
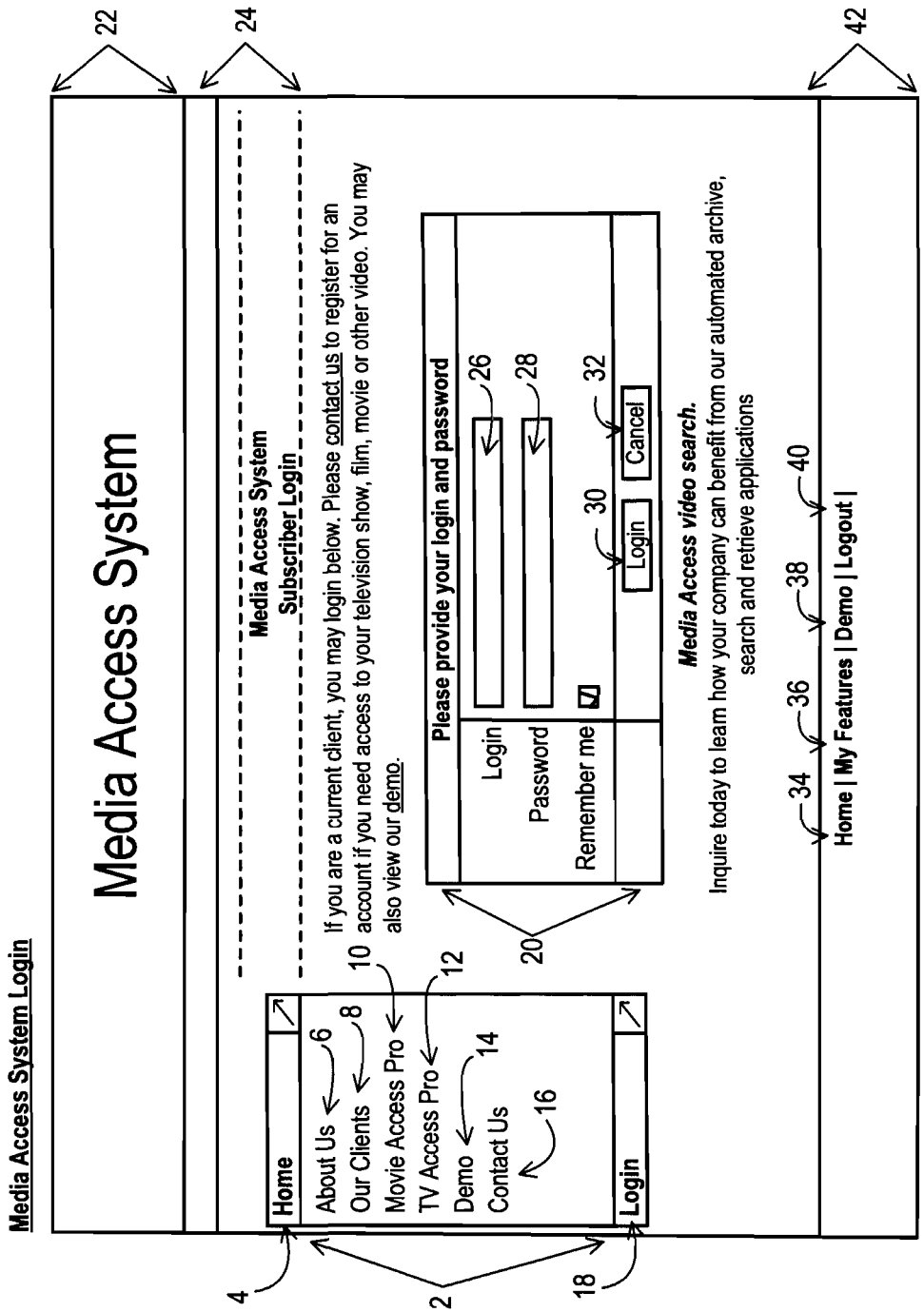
FIG. 3 is a schematic representation of a web interface component of an improved media access system in accordance with an embodiment of the present invention.

Referring to FIG. 3, a side system navigation area 2 provides the users with easy navigation between components of the web interface. A home hyperlink 4 transfers the users to the 'Home' component. An about us hyperlink 6 transfers the users to the 'About Us' component. An our clients hyperlink 8 transfers the users to the 'Our Clients' component. A movie access pro hyperlink 10 transfers the users to the 'Movie Access Pro' component. A TV access pro hyperlink 12 transfers the users to the 'TV Access Pro' component. A demo hyperlink 14 transfers the users to the 'Demo' component. A contact hyperlink 16 transfers the users to the 'Contact Us' component. A login hyperlink 18 transfers the users to the 'Login' component as shown in FIG. 3.

Still referring to FIG. 3, users must provide a username in a username field 26 and a password in a password field 28, both appearing in a login form 20, to gain access to the web interface of system 1000 (FIG. 1). Once the relevant information is entered in login form 20, the user activates a login button 30 to gain access to the web interface of system 1000. Activating a clear button 32 will clear any information entered in login form 20. A system header image 22 displays the system's header image and a system title bar 24 displays the system's title.

A bottom bar home hyperlink 34 provides an additional link to the 'Home' component. A bottom bar features hyperlink 36 provides a link to a component of the web interface displaying the features assigned to the users' account as described below. A bottom bar demo hyperlink 38 provides an additional link to the 'Demo' component. A bottom bar login hyperlink 40 returns the user to the 'Login' component as shown in FIG. 3. Bottom footer 42 contains navigation hyperlinks 34, 36, 38, and 40, as well as copyright information.

Figure 4:
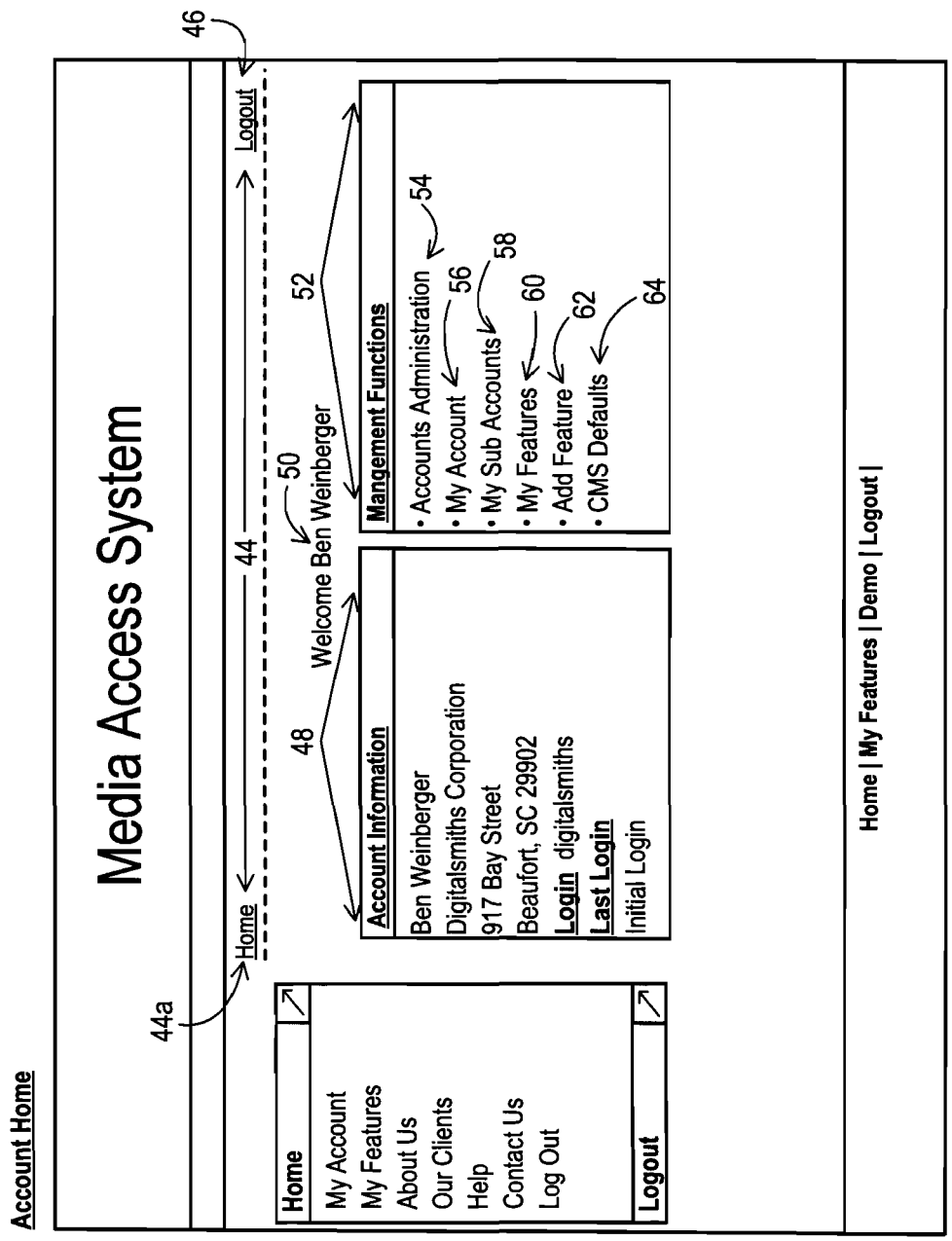
FIG. 4 is a schematic representation of a web interface component of an improved media access system in accordance with an embodiment of the present invention.

Referring to FIG. 4, a section 44 is a secondary navigation bar providing access to different components of the web interface of system 1000 (FIG. 1). A home hyperlink 44a returns the user to their account information page (FIG. 4). A logout hyperlink 46 logs the user out of the system 1000 and returns user to the login component (FIG. 1). An account information section 48 provides information regarding the account of the current user. An account welcome bar 50 provides a welcome message to the current user.

Account management navigation links 52 provide access to components of the web interface allowing management of the account of the current user. Certain links within account management navigation links 52 are displayed based on the assigned account permissions of the current user. An administrative hyperlink 54 links users to components of the web interface used to manage the system account. An account information hyperlink 56 provides a link to components of the web interface used to display and update information corresponding to the account of the current user. A sub-account hyperlink 58 provides the user with access to the main account's sub-accounts if present. Only primary accounts, not sub-accounts, will display this option. A features hyperlink 60 lists selected features assigned to the current account. A new feature hyperlink 62 links the user to a component of the web interface used to create a new feature under the selected account. A CMS default hyperlink 64 links the user to a CMS application default component. CMS defaults hyperlink 64 will only appear when users with administrative access to the selected account are logged in. The CMS application and associated pages are described in more detail below.

Figure 5:
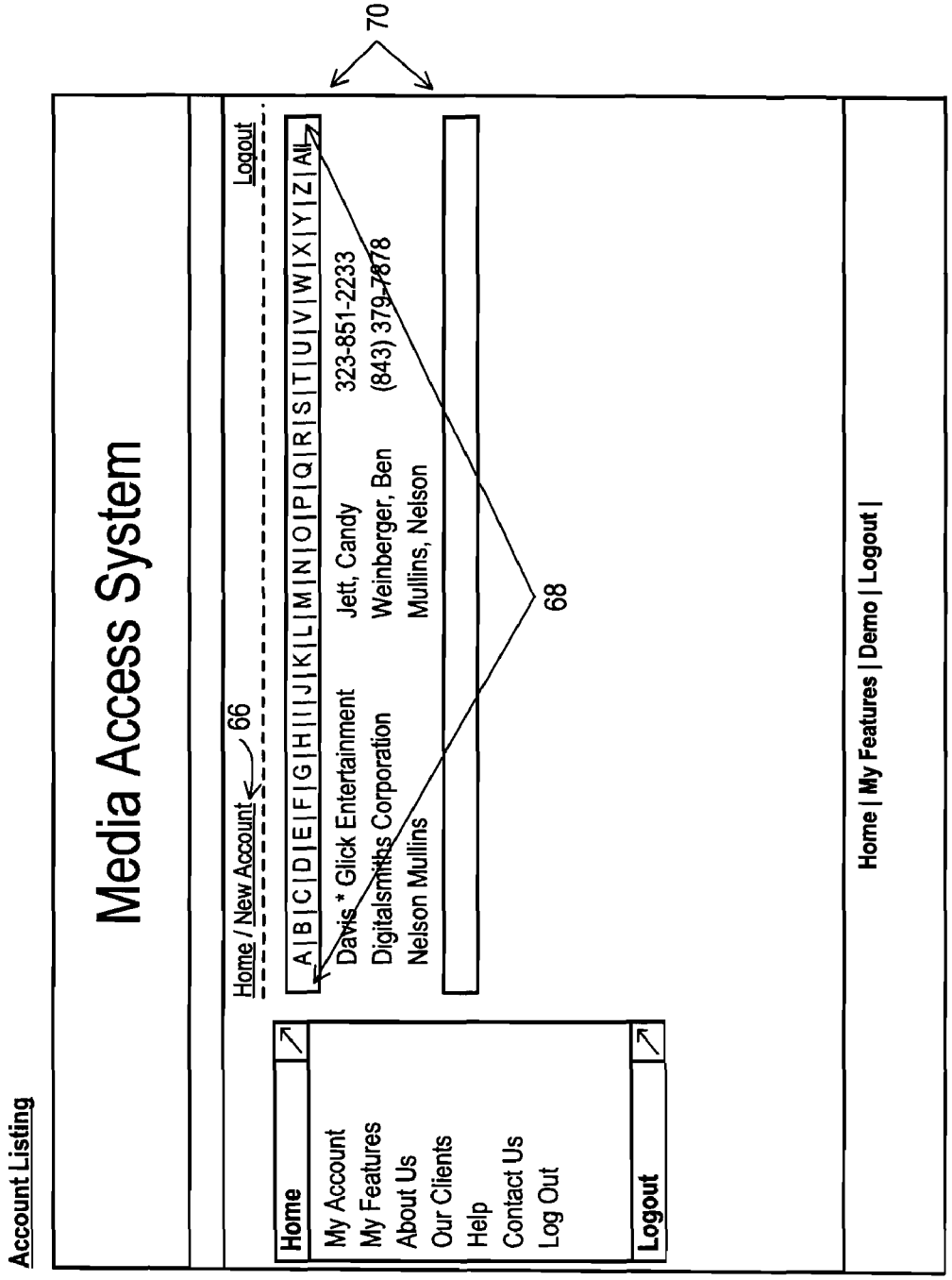
FIG. 5 is a schematic representation of a web interface component of an improved media access system in accordance with an embodiment of the present invention.

Referring to FIG. 5, a new account hyperlink 66 allows the user to create a new account. An alpha hyperlink bar 68 allows the current user to filter user accounts alphabetically. An account listing section 70 lists each account, sorted by company name. Each account name listed in account listing section 70 is a hyperlink that transfers the current user to the 'Account Details' component, as described below with reference to FIG. 6.

Figure 6:
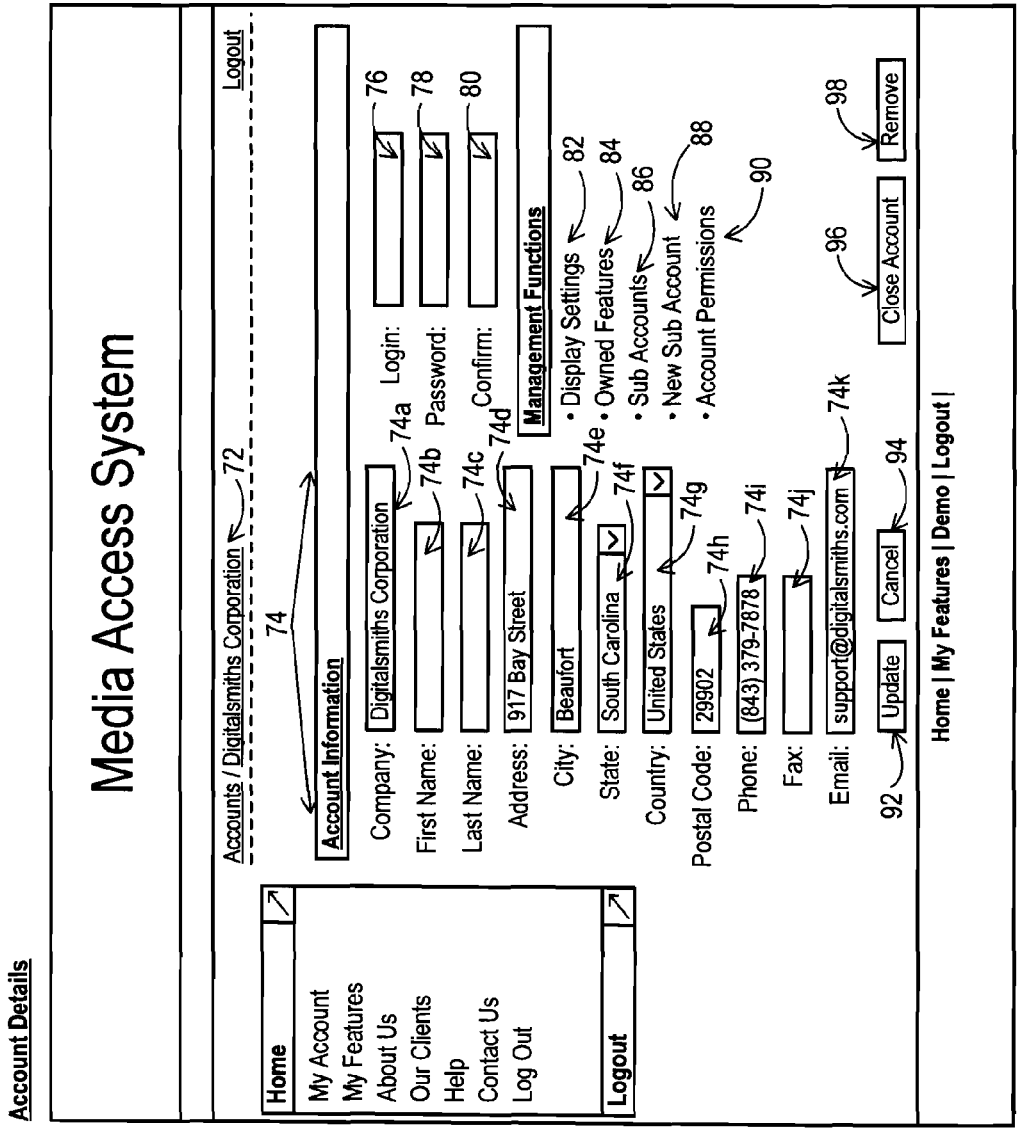
FIG. 6 is a schematic representation of a web interface component of an improved media access system in accordance with an embodiment of the present invention.

Referring to FIG. 6, an account company name label 72 shows the company name of the current account. An account information section 74 displays information associated with the current account. An account company name field 74a lists the company name under which the current account will be or is assigned. An account contact first name field 74b allows the current user to set or change the first name of the contact person for the current account. An account contact last name field 74c allows the current user to set or change the first name of the contact person for the current account. Account address fields 74d, 74e, 74f, 74g, 74h, 74i, 74j, and 74k allow the current user to set or change the company's contact information for the current account. An update button 92 allows the current user to update the account information for the current account by storing the information entered in account fields 74 in database 1004 (FIG. 1). A cancel button 94 allows the current user to cancel any changes made in the 'Accounts Details' component (FIG. 6) and return to the 'Account Listing' component (FIG. 5).

Figure 7:
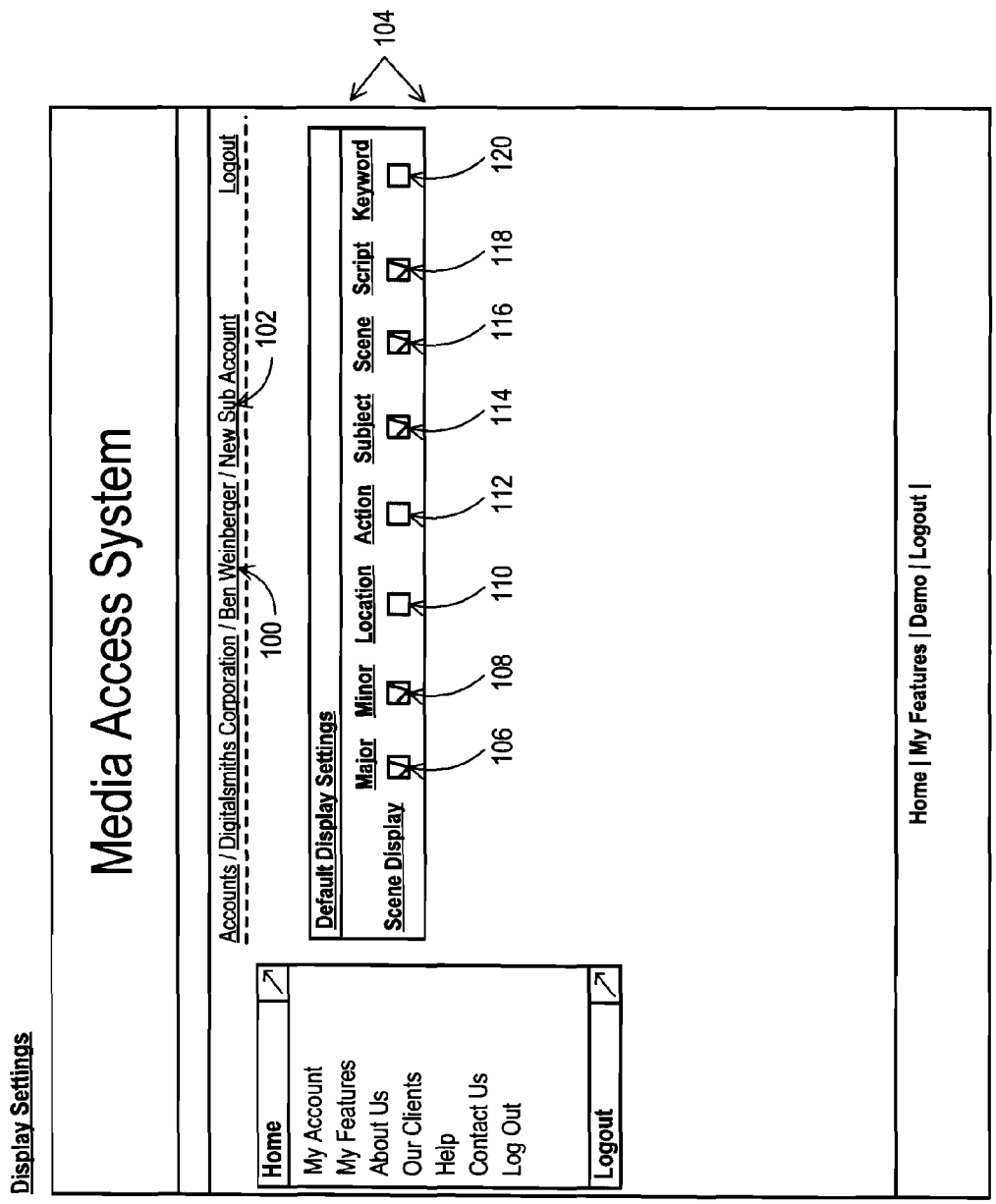
FIG. 7 is a schematic representation of a web interface component of an improved media access system in accordance with an embodiment of the present invention.
Figure 9:
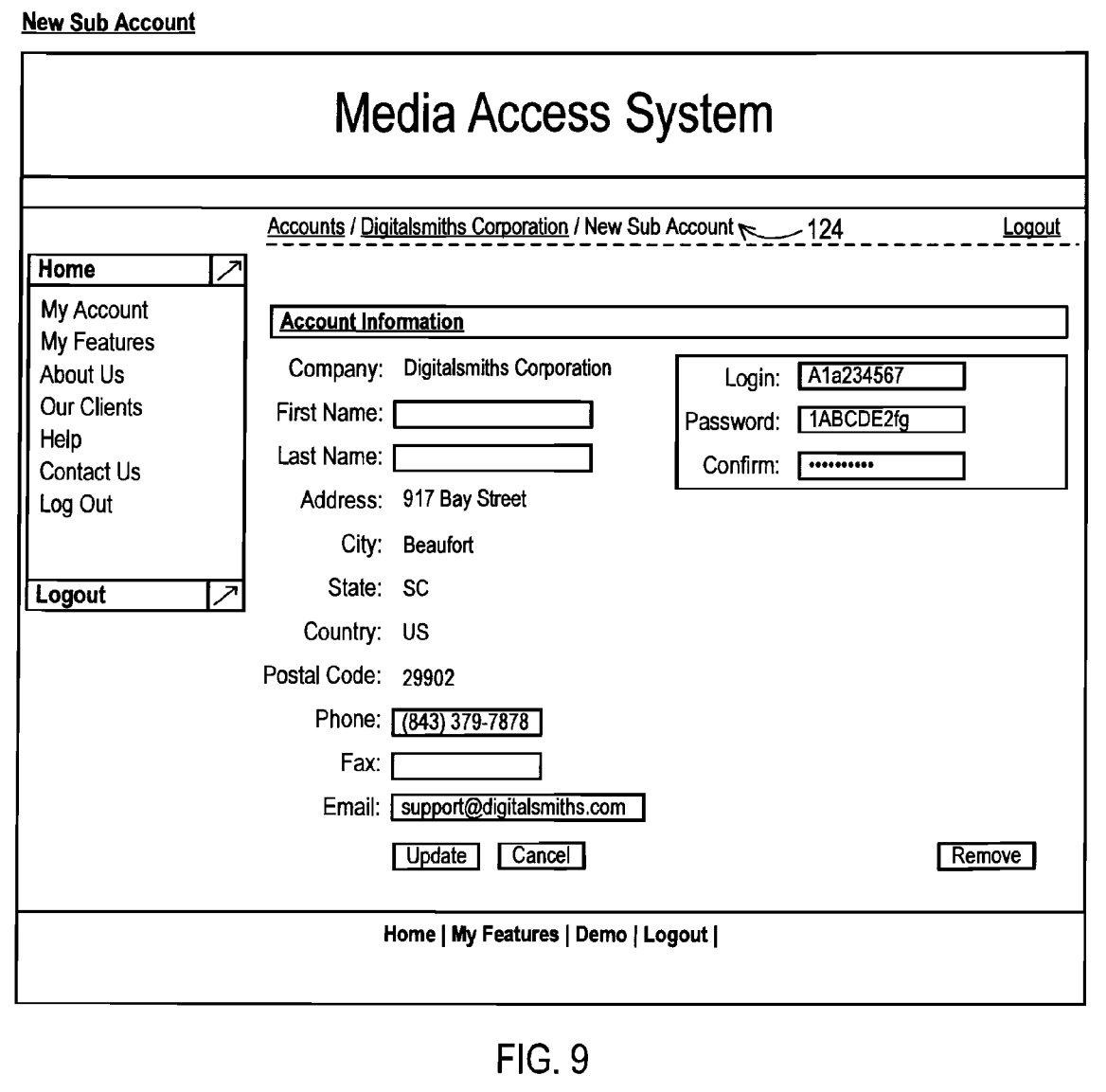
Figure 10:
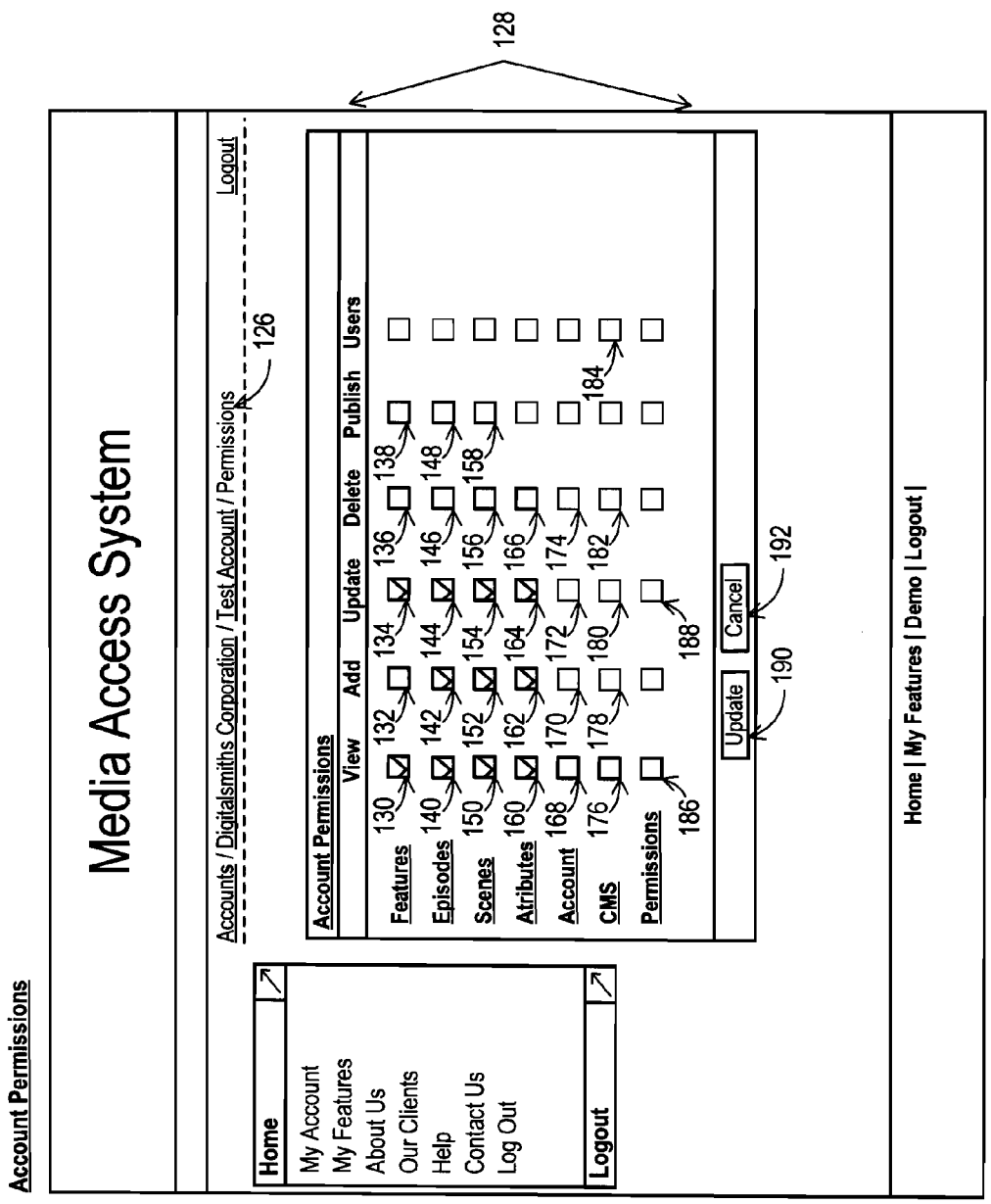
FIG. 10 is a schematic representation of a web interface component of an improved media access system in accordance with an embodiment of the present invention.
Figure 13:
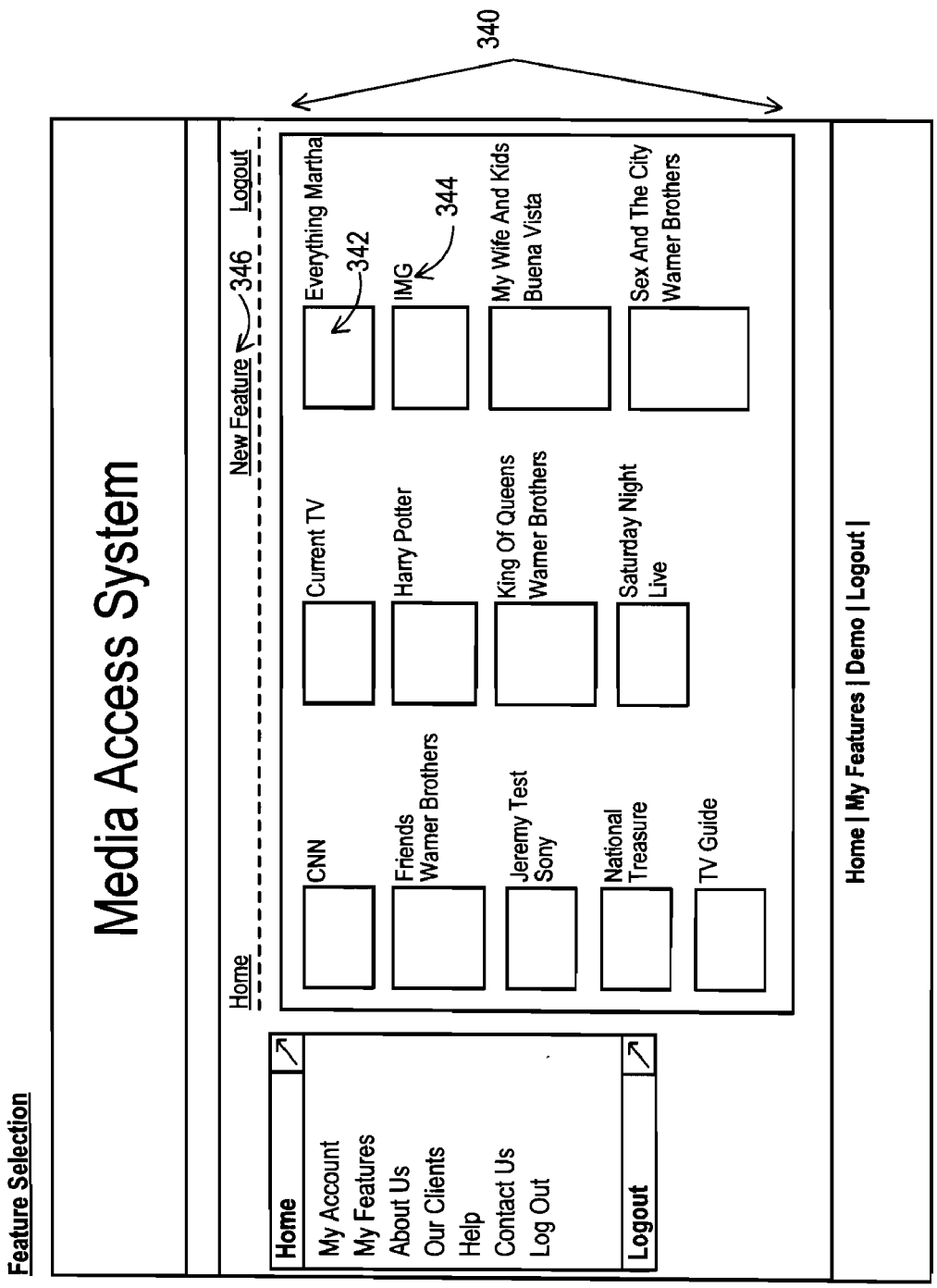
FIG. 13 is a schematic representation of a web interface component of an improved media access system in accordance with an embodiment of the present invention.

Still referring to FIG. 6, account login fields 74, 76, 78, and 80 allow the current user to set or change the current user's login information. A display settings hyperlink 82 links the current user to the account display component as shown in FIG. 7. A features hyperlink 84 links the current user to a component of the web interface as shown in FIG. 13 displaying the features assigned to the account. A sub-account hyperlink 86 links the current user to a component of the web interface as shown in FIG. 8 used to manage any sub-accounts of the current account. A new sub-account hyperlink 88 links the current user to a component of the web interface as shown in FIG. 9 allowing creation of a new sub-account. An account permissions hyperlink 90 links the current user to a component of the web interface as shown in FIG. 10 allowing management of account permissions. A close account button 96 closes the account and locks the account holder from logging into the web interface of system 1000. A remove button 98 allows the current user to remove the account from system 1000, which removes the account from the account listings component as shown in FIG. 5.

Referring to FIG. 7, an account detail hyperlink 100 links the user back to the account detail component (FIG. 6). An new sub-account hyperlink 102 links the user to a component used to create a new sub-account (FIG. 9). A default display settings section 104 displays the default display settings for the scene component as described below with reference to FIG. 26. Checkboxes 106, 108, 110, 112, 114, 116, 118, and 120 provide the user with the option of determining which options appear on the scene component described below.

FIG. 8 is similar to FIG. 6, but allows the current user to modify settings associated with the chosen sub-account, as opposed to the main account. A permissions hyperlink 122 allows the current user to set user permissions for each feature of the sub-account.

FIG. 9 demonstrates a component of the web interface of system 1000 which allows the current user to create a new sub-account for the selected account. A new sub-account label 124 indicates this is the creation of a new user sub-account page to the current user.

FIG. 10 depicts a component of the web interface of system 1000 that allows the current user to set the permissions for the current account. A permissions page title 126 shows this is the permissions component. An account permissions section 128 contains all the account permission settings described in detail below. The use of a checkbox 130 toggles the ability to view features for the current account. Unmarking checkbox 130 disables and locks checkboxes 132, 134, 136, and 138 under Features, Episodes, Scenes, and Attributes (described below) and locks each corresponding checkbox. Alternatively, marking checkbox 130 enables, but does not mark, checkboxes 132, 134, 136, and 138.

A checkbox 132 toggles the ability to add new features to the selected account. A 'new feature' hyperlink 346 (FIG. 13) is displayed on a secondary navigation bar under the features section of system 1000 described in more detail below. A checkbox 134 toggles the ability to update features of the account. The user is presented with the feature details components of the web interface as shown in FIG. 13 through FIG. 26 without any form fields or update buttons to change options. A checkbox 136 toggles the ability of users to delete features of the current account. A checkbox 138 toggles the ability of users to publish features of the current account to the CMS application described below. Publishing the features means compiling the feature in a separate application allowing it to operate completely outside of system 1000. This process is discussed in greater detail below.

A checkbox 140 toggles the ability to view episodes of the current account. Marking checkbox 140 enables checkboxes 142, 144, 146, and 148 and also displays the 'Episodes' hyperlink on the navigational tool bar under each feature management component as described in more detail below with respect to FIG. 13 through FIG. 26. Unmarking checkbox 140 unmarks and disables corresponding checkboxes 142, 144, 146, and 148. Checkboxes 142, 144, 146, and 148 function similar to checkboxes 130, 132, 134, and 138 (described above), respectively, but with respect to 'Episode' features described in detail below with reference to FIG. 13 through FIG. 26.

A checkbox 150 functions similar to checkboxes 130 and 140 described above and toggles the ability to view the components of the web interface regarding 'Scene' features as described in more detail below. Likewise, checkboxes 152, 154, 156, and 158 function similar to checkboxes 130, 132, 134, and 138 (described above), respectively, but with respect to 'Scene' features described in detail below with reference to FIG. 13 through FIG. 26.

A checkbox 160 functions similar to checkboxes 130, 140, and 150 described above and toggles the ability to view the components of the web interface regarding 'Attributes' features as described in more detail below. Likewise, checkboxes 162, 164, and 166 function similar to checkboxes 130, 132, and 134 (described above), respectively, but with respect to 'Attributes' features described in detail below with reference to FIG. 13 through FIG. 26.

A checkbox 168 toggles the ability to of the current account to view accounts and sub-accounts, such that, marking this checkbox enables corresponding checkboxes 170, 172, and 174. It also displays sub-account hyperlink 58 under management functions section 52 on the account home component as shown in FIG. 6. Unmarking checkbox 168 unmarks and disables corresponding checkboxes 170, 172, and 174 for each corresponding account checkbox. Accounts are considered sub-accounts if they are located under the primary account. If user is an administrator, then permission applies to system and primary accounts as well as sub-accounts. A checkbox 170 toggles the ability to add new accounts to the current account. Marking checkbox 170 displays new sub-account hyperlinks 66 (FIG. 5) and 88 (FIG. 6). A checkbox 172 toggles the ability to update accounts. Unmarking checkbox 172 disables the ability for any of the account's users to update account fields 74 (FIG. 6). A checkbox 174 toggles the ability to delete accounts. Marking checkbox 174 presents the user with a delete option beside each account listed in account listing section 70 (FIG. 5) allowing deletion of that account.

Figure 28:
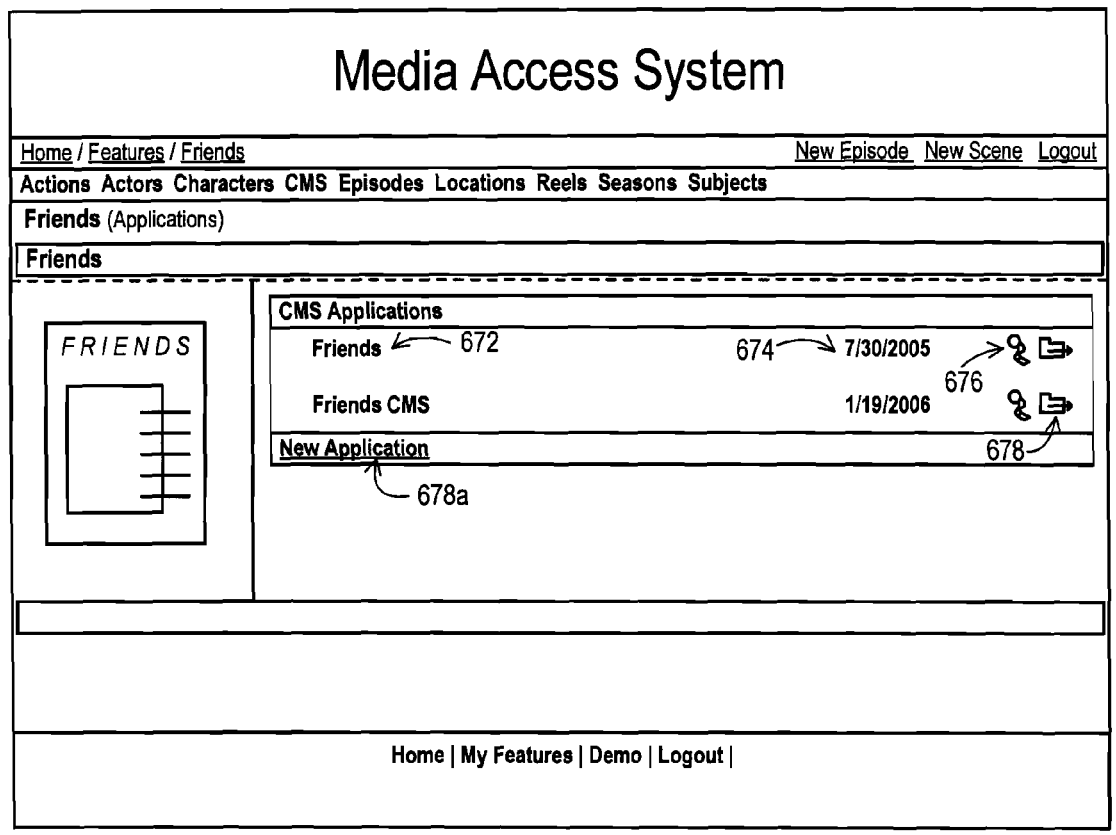
FIG. 28 is a schematic representation of a web interface component of an improved media access system in accordance with an embodiment of the present invention.

Still referring to FIG. 10, a checkbox 176 toggles the ability to view the setting for the Content Management System ("CMS") for the account. CMS is an application that allows users of system 1000 to design a custom front-end system. Other CMS users can use the custom-designed from-end to search the video clips contained in system 1000 based on specific audio and visual identifiers. These audio and visual identifiers are the established identifiers discussed above by which database 1004 will be catalogued and indexed as described below. One skilled in the art should understand that the CMS application can operate as both a standalone application as well as a component of the web interface of system 1000. CMS is discussed in greater detail below with reference to FIG. 28 through FIG. 36. Marking checkbox 176 displays the 'CMS' link on the features components of the web interface discussed below with reference to FIG. 13 through FIG. 26. A checkbox 178 toggles the ability to add additional CMS applications to the current account. A user may create as many different CMS applications as desired. Marking checkbox 178 displays the new application hyperlink 678*a* (FIG. 28). A checkbox 180 toggles the ability to update CMS applications of the current account. A checkbox 182 toggles the ability to delete CMS applications from the current account. A checkbox 184 toggles the ability to manage permissions and details of CMS application users. Marking checkbox 184 displays a manage users hyperlink 904 (FIG. 31), which allows the current user to manage user accounts that can log into the published front-end application described in more detail below.

A checkbox 186 toggles the ability to view account permissions of each sub-account. A checkbox 188 toggles the ability to update account permissions for each sub-account. Activation of a button 190 stores the status of fields 130 through 188 found on the account permissions page as shown in FIG. 10 in database 1004 (FIG. 1). Activation of button 192 resets permissions to their previous settings.

Figure 11:
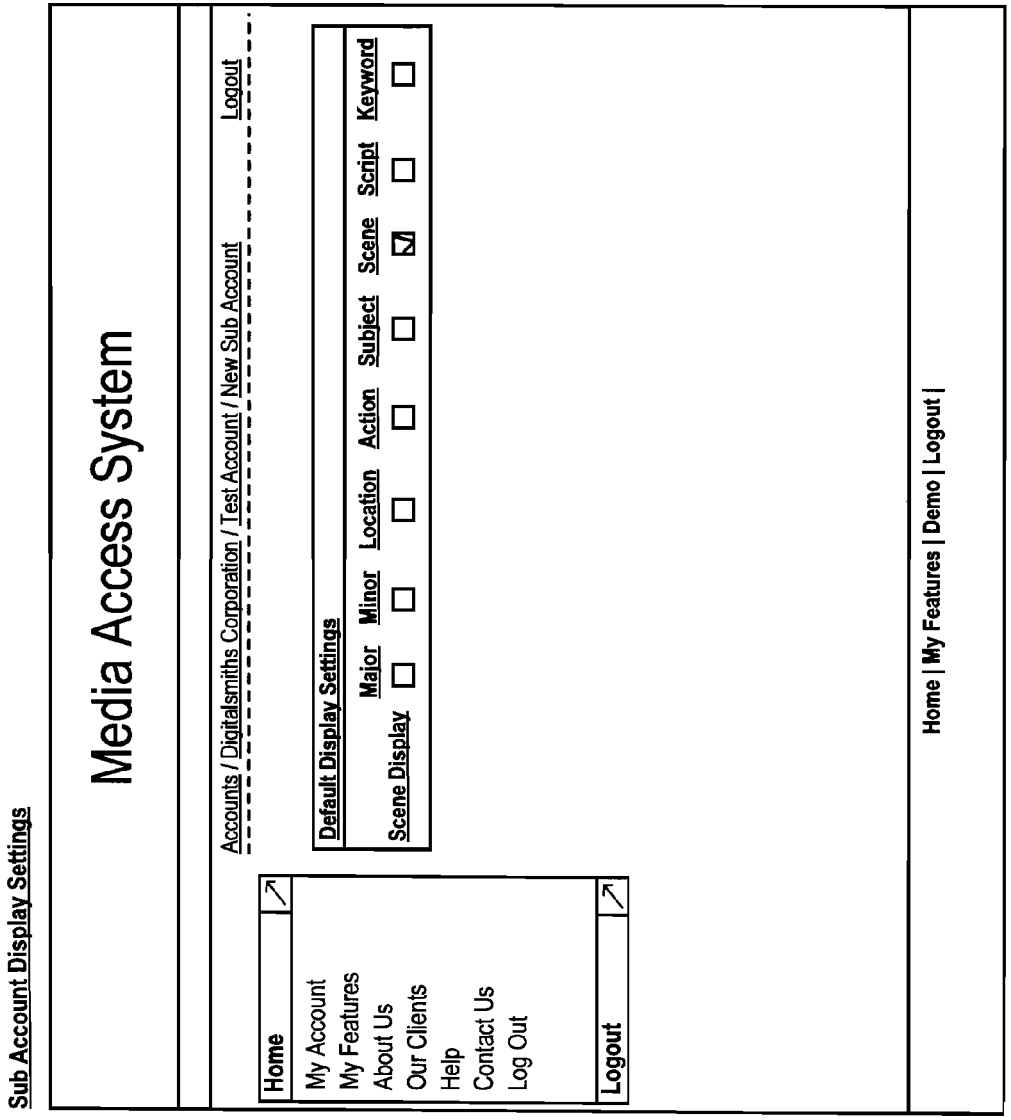
FIG. 11 is a schematic representation of a web interface component of an improved media access system in accordance with an embodiment of the present invention.

The web interface component shown in FIG. 11 allows the current user to set the sub-account display settings and operates identical as the component described above with reference to FIG. 7.

Figure 12:
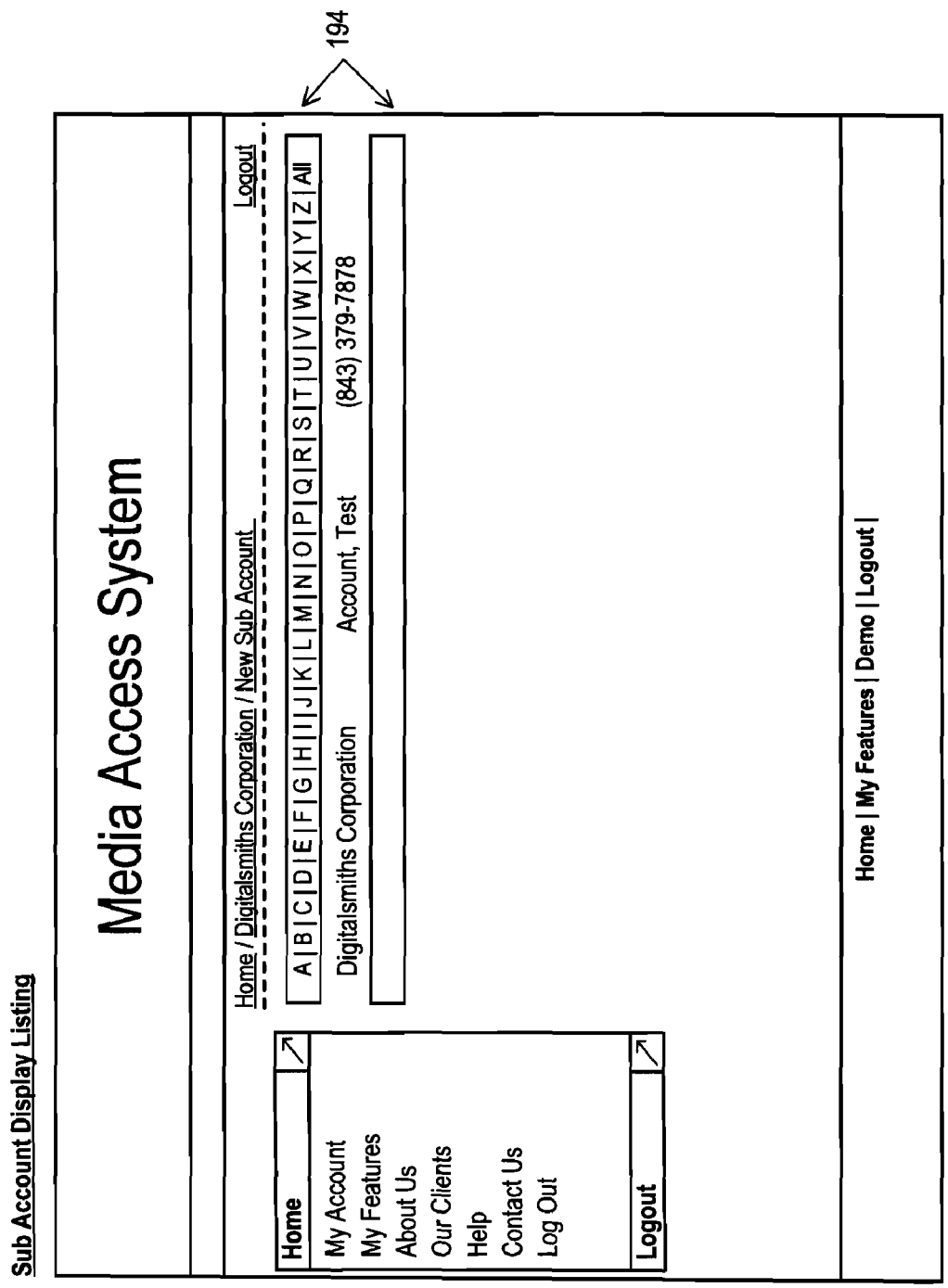
FIG. 12 is a schematic representation of a web interface component of an improved media access system in accordance with an embodiment of the present invention.

Referring to FIG. 12, a sub-account listing section 194 lists the sub-accounts of the current account and allows the current user to link to each sub-account. Section 194 operates approximately the same as section 70 (FIG. 5).

Referring to FIG. 13, a feature selection section 340 provides a thumbnail listing of all features assign to the current account. Users logged in with administrative permissions will see all features of system 1000 (FIG. 1). Section 340 contains a separate thumbnail image, such as a feature title image 342, for each feature of the current account. A feature name, such as a feature title label 344, appears adjacent to each thumbnail image, displaying the name assigned to the feature. These thumbnail images and labels also act as hyperlinks linking the users to the detail components of the selected feature discussed in more detail below. A new feature hyperlink 346 links to a component of the web interface as shown in FIG. 14 allowing users to add a new feature to the current account.

Figure 14:
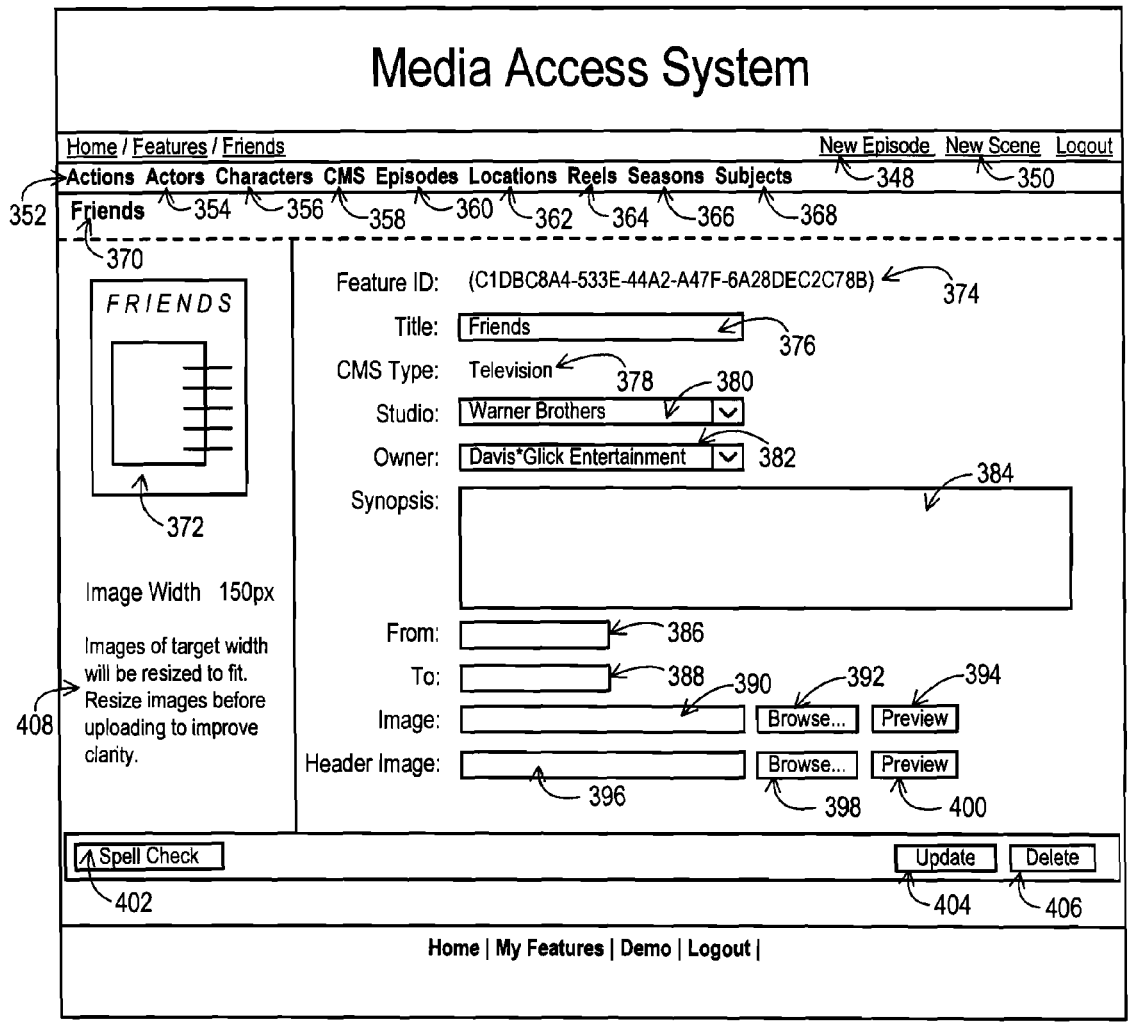
FIG. 14 is a schematic representation of a web interface component of an improved media access system in accordance with an embodiment of the present invention.
Figure 15:
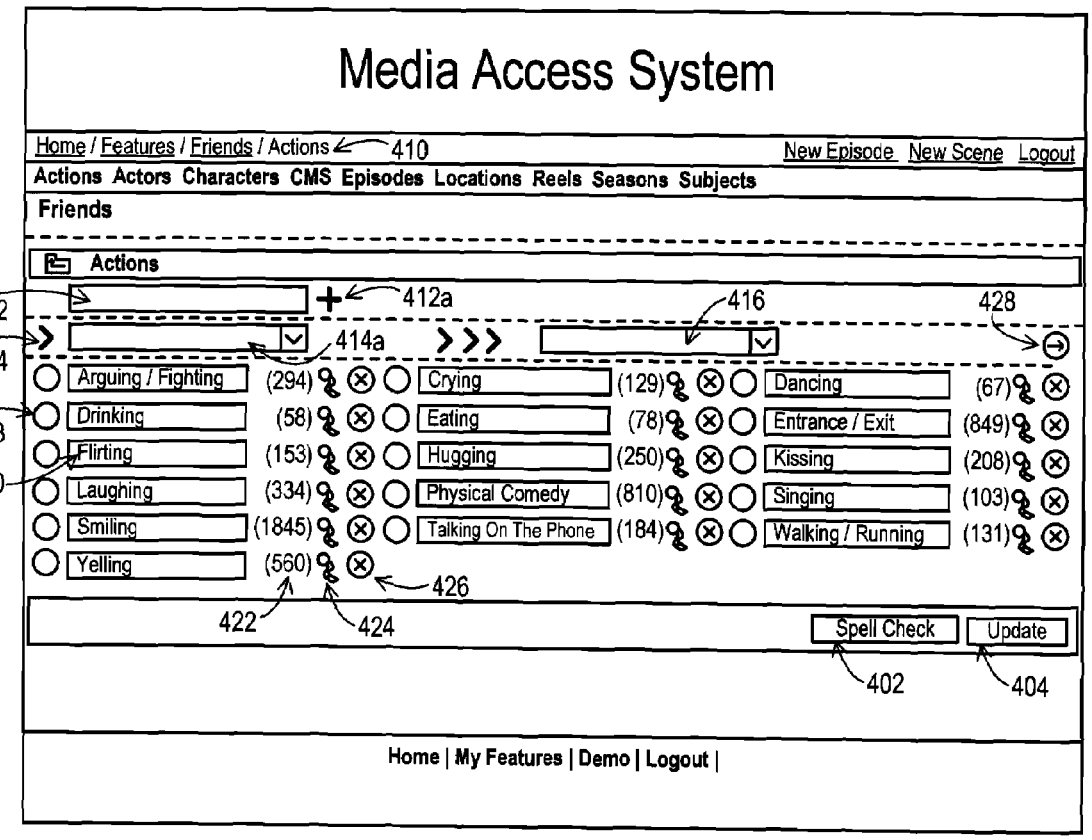
FIG. 15 is a schematic representation of a web interface component of an improved media access system in accordance with an embodiment of the present invention.
Figure 16:
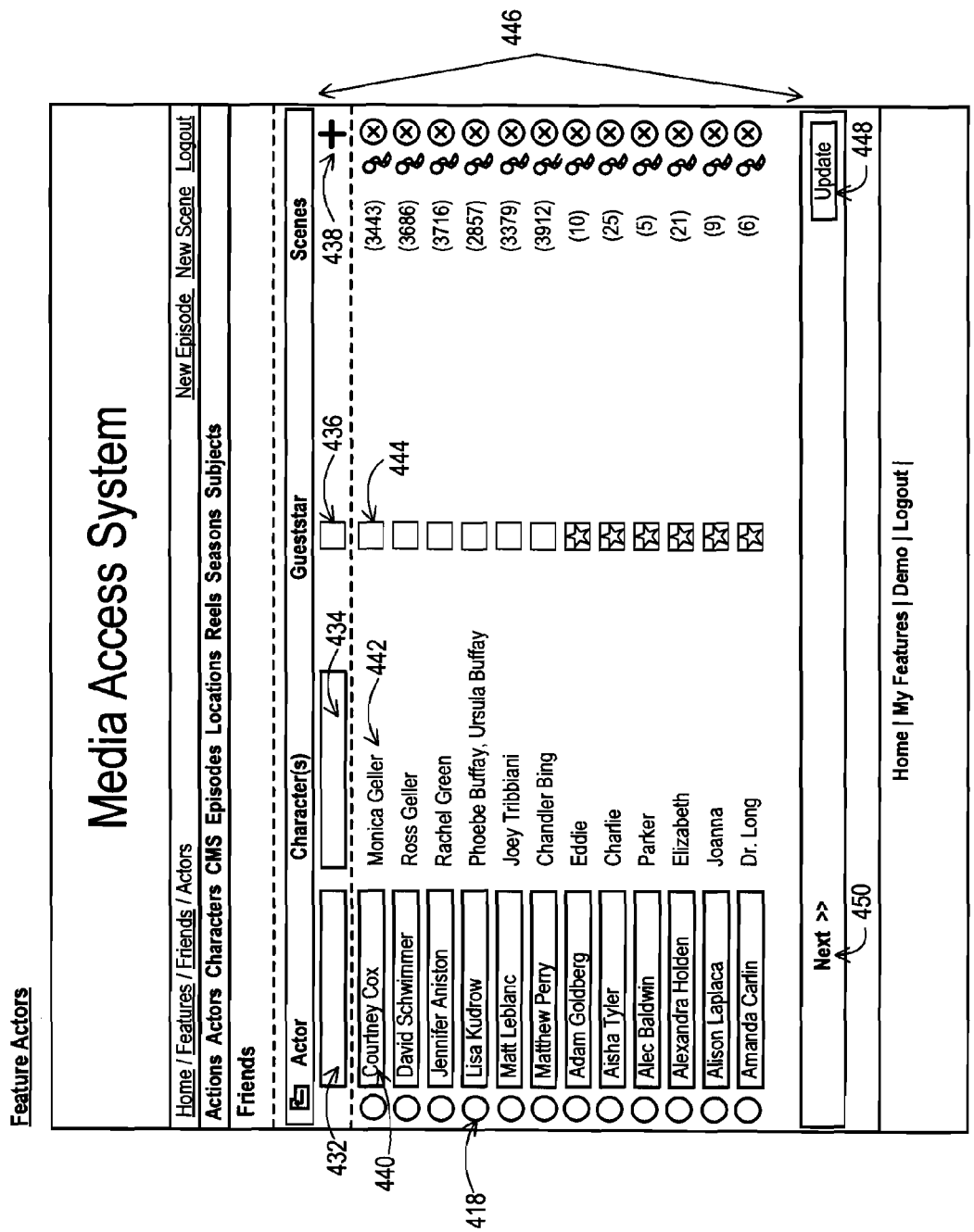
FIG. 16 is a schematic representation of a web interface component of an improved media access system in accordance with an embodiment of the present invention.
Figure 17:
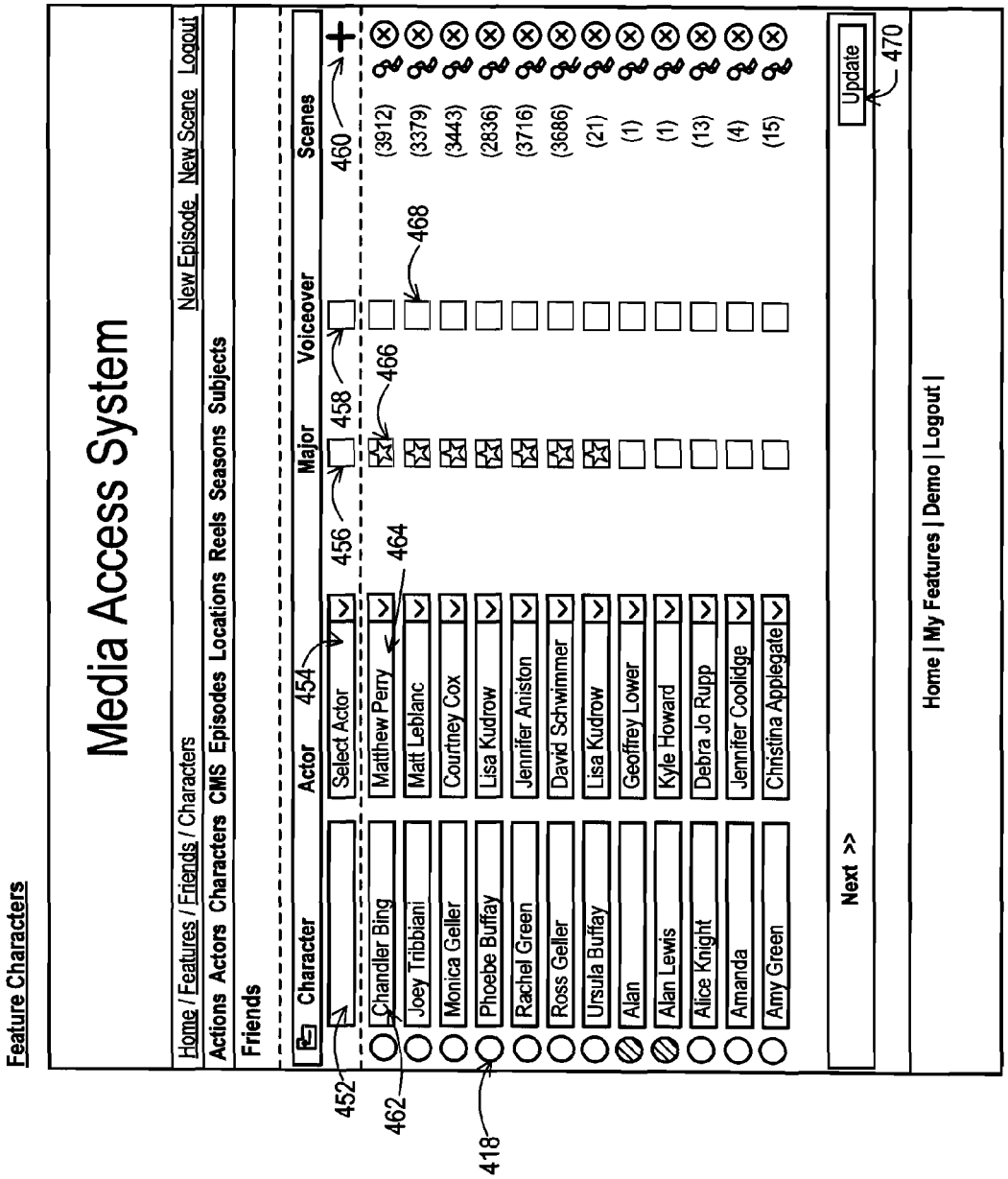
FIG. 17 is a schematic representation of a web interface component of an improved media access system in accordance with an embodiment of the present invention.
Figure 19:
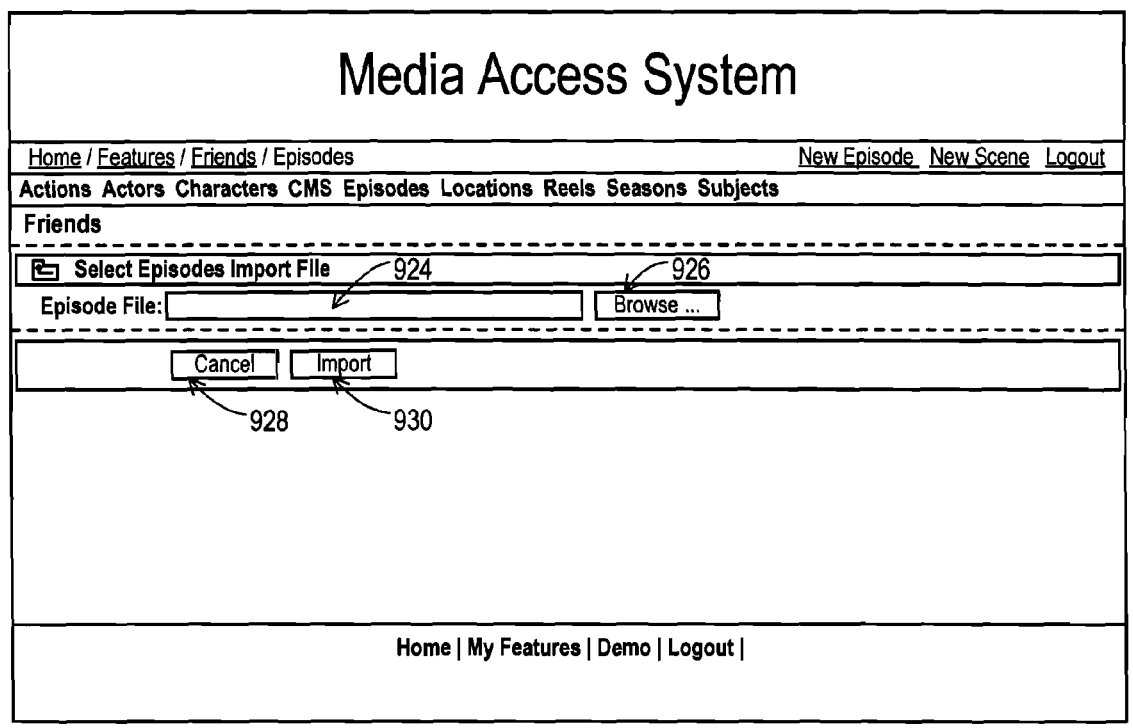
FIG. 19 is a schematic representation of a web interface component of an improved media access system in accordance with an embodiment of the present invention.
Figure 21:
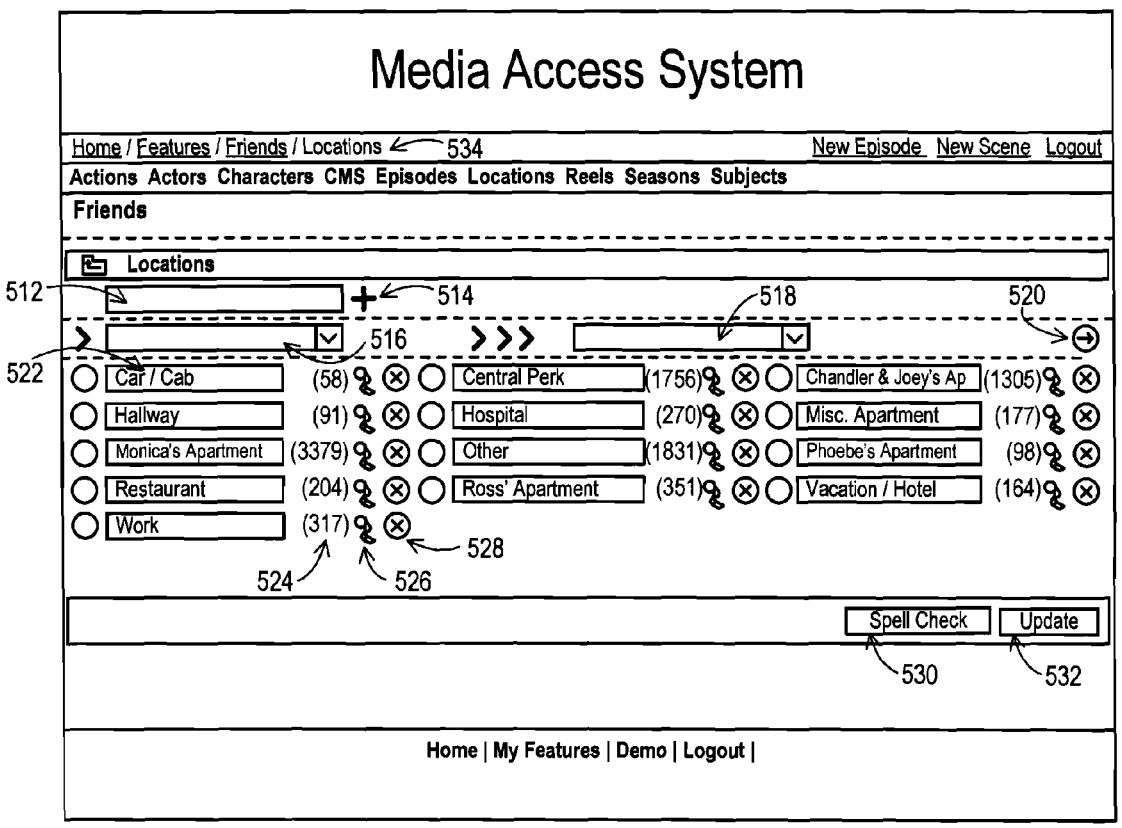
FIG. 21 is a schematic representation of a web interface component of an improved media access system in accordance with an embodiment of the present invention.
Figure 22:
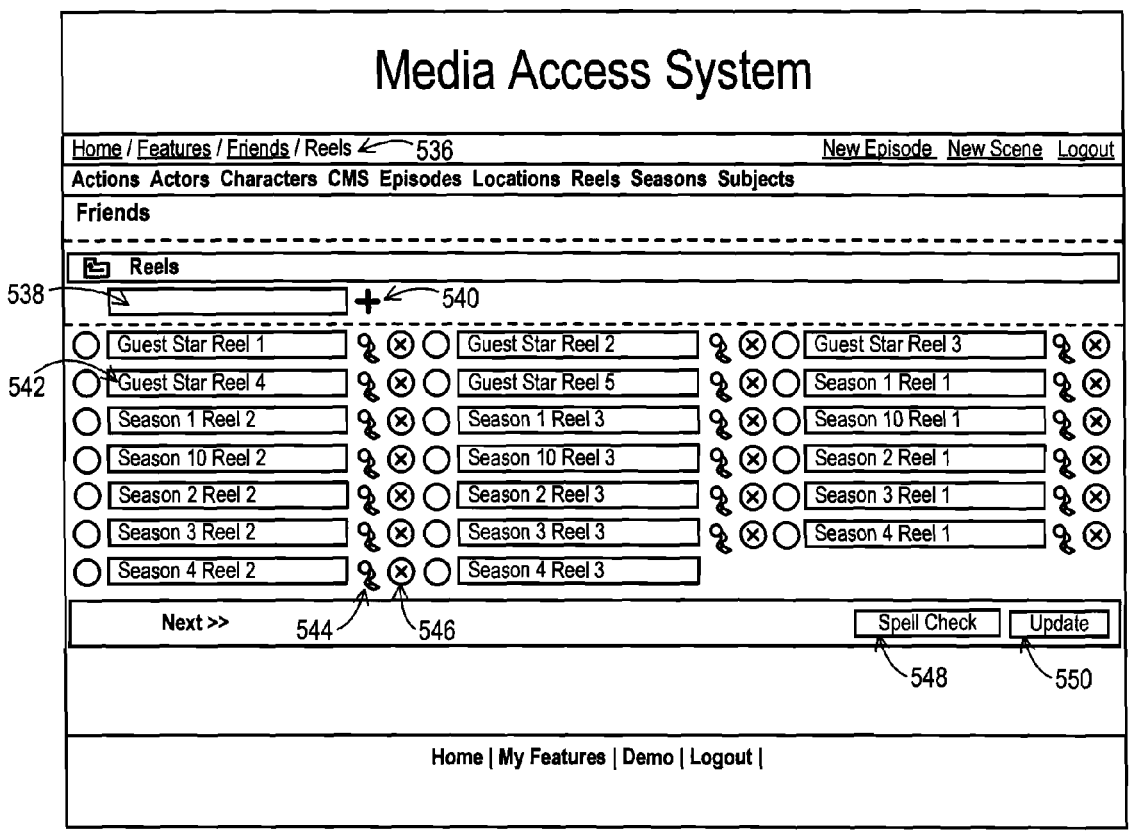
FIG. 22 is a schematic representation of a web interface component of an improved media access system in accordance with an embodiment of the present invention.
Figure 24:
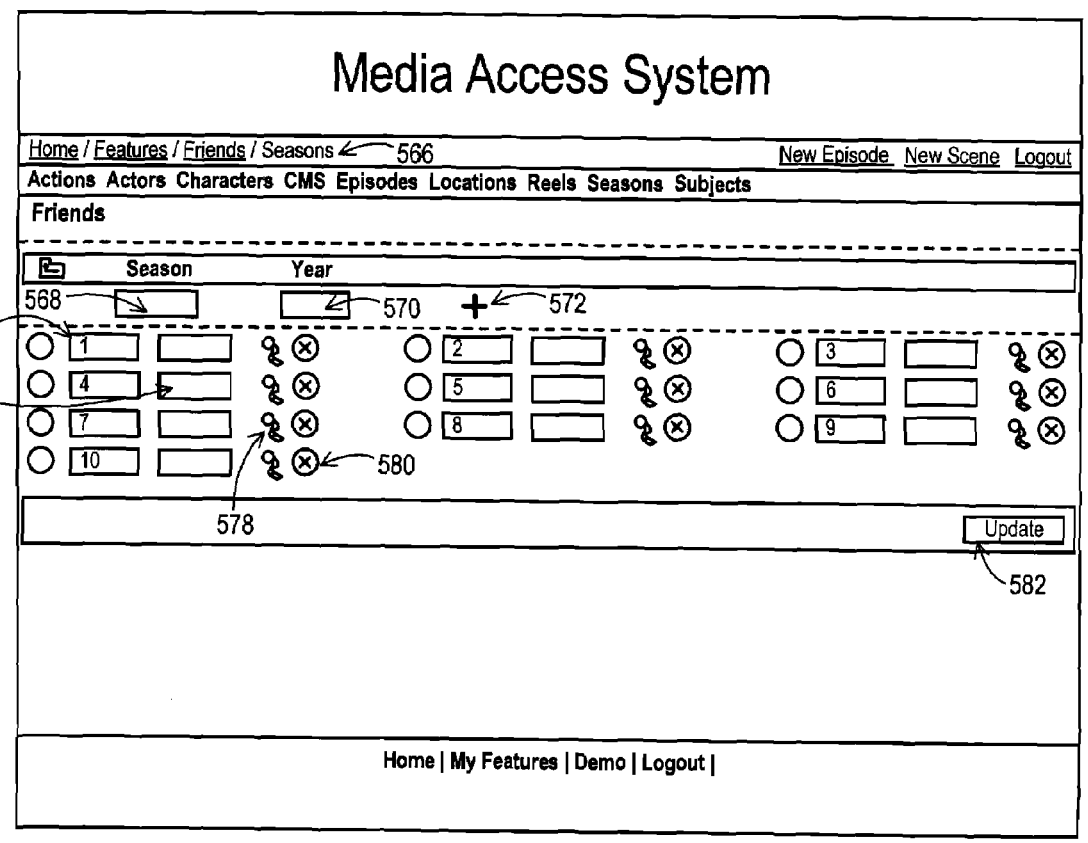
FIG. 24 is a schematic representation of a web interface component of an improved media access system in accordance with an embodiment of the present invention.
Figure 25:
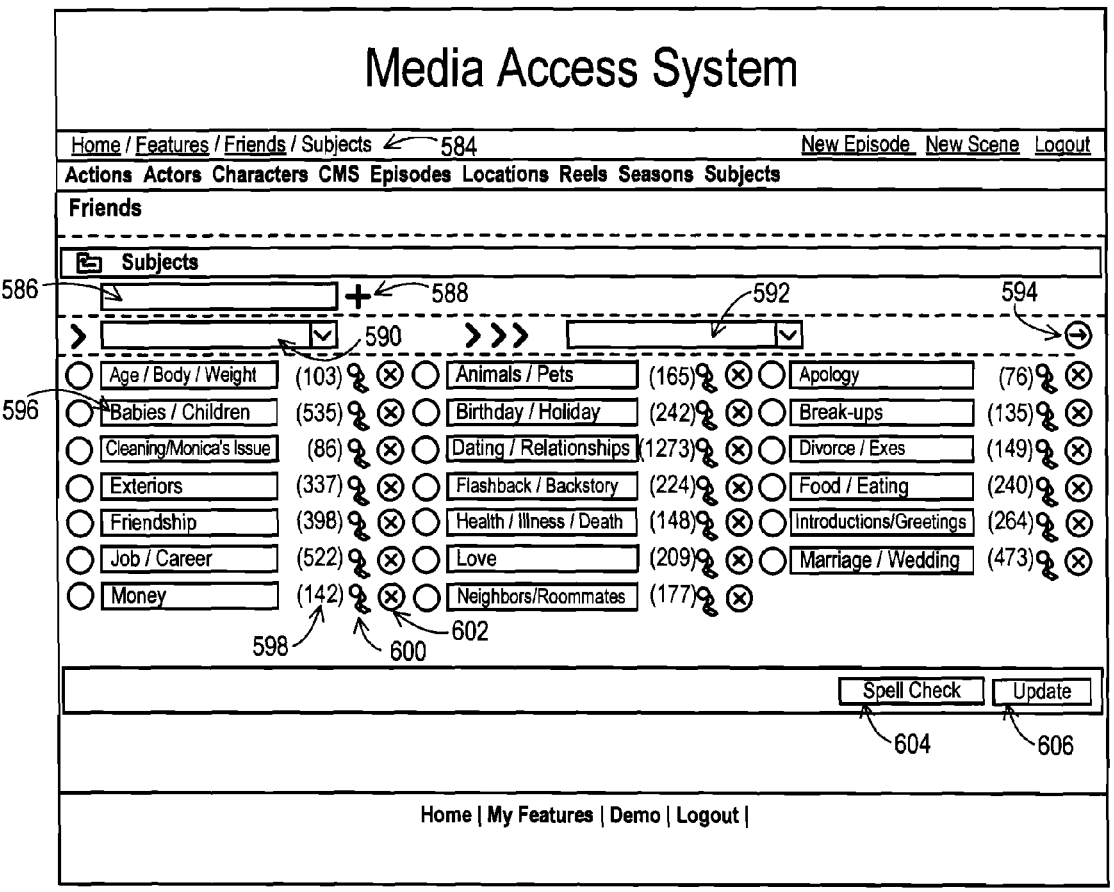
FIG. 25 is a schematic representation of a web interface component of an improved media access system in accordance with an embodiment of the present invention.
Figure 27:
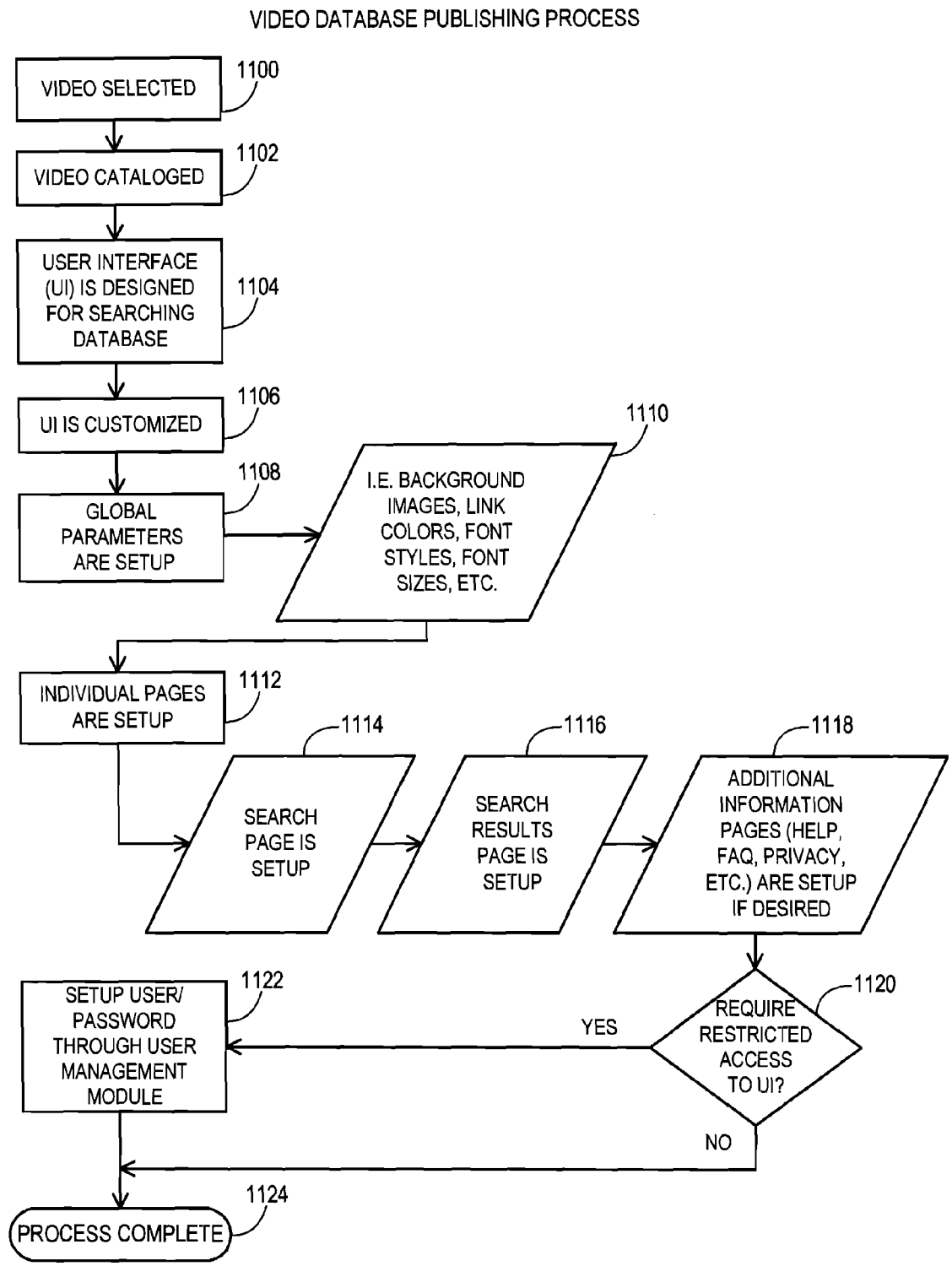
FIG. 27 is a flowchart of a method of an improved media access system in accordance with an embodiment of the present invention.

Referring to FIG. 14, a new episode hyperlink 348 links to a component of the web interface as shown in FIG. 19 that allows users to add a new episode to the current feature. Hyperlink 348 appears only when the video being indexed and catalogued related to the current feature is from a television feature. A new scene hyperlink 350 links to a component of the web interface as shown in FIG. 26 that allows users to add a new scene to the current feature. An actions hyperlink 352 links to a component of the web interface as shown in FIG. 15 that lists actions assigned to the current feature. An actors hyperlink 354 links to a component of the web interface as shown in FIG. 16 that lists actors assigned to the current feature. A characters hyperlink 356 links to a component of the web interface as shown in FIG. 17 that lists characters assigned to the current feature. A CMS hyperlink 358 links to a component of the web interface as shown in FIG. 27 listing CMS applications assigned to the current feature. CMS applications are described in more detail below. An episode hyperlink 360 links to a component of the web interface as shown in FIG. 18 that lists episodes assigned to the current feature. A locations hyperlink 362 links to a component of the web interface as shown in FIG. 21 that lists locations assigned to the current feature. A reels hyperlink 364 links to a component of the web interface as shown in FIG. 22 that lists reels assigned to the current feature. A seasons hyperlink 366 links to a component of the web interface as shown in FIG. 24 that lists seasons assigned to the current feature. A subjects hyperlink 368 links to a component of the web interface as shown in FIG. 25 that lists subjects assigned to the current feature.

Still referring to FIG. 14, a feature title label 370 displays the title of the current feature. A feature image 372 displays a thumbnail image assigned to the current feature, which is uploaded using a button 392 described below. Image 372 is shown wherever a thumbnail representing the feature is used. A feature ID 374 is a unique identifier assigned to the current feature by system 1000 (FIG. 1). Users enter the name or title of the current feature, which is generally the title of a movie or television show, in a feature title field 376. Users enter a feature type, which is usually 'Television' or 'Move,' in a CMS type field 378. CMS type field 378 determines what options are shown to the users for the current feature throughout the web interface of system 1000 (FIG. 1). Users enter the name of the studio that produced the current feature in studio field 380. Users enter the name of the owner of the current feature in an owner field 382. Users can enter a description of the current feature in a synopsis field 384. Users enter the date on which the current feature began in a from field 386. Users enter the date on which the current feature ended in a to field 388.

Users enter the file location of feature image 372 in an image field 390. Users may activate a browse button 392 to open a file browser window to find and select an image file to be used as feature image 372. A preview button 394 allows users to preview the image file selected using button 382 before uploading. Users may enter the file location of a header image to be displayed instead of feature title label 370 in a header image field 396. A second browse button 398 opens a second file browser window to locate and select an image file to be used as a header image. A second preview button 400 allows users to preview the header image located and selected using button 400.

Activating a spell check button 402 checks the spelling of each field in FIG. 14. Activating an update button 404 stores the information entered into the fields in FIG. 14 into database 1004 (FIG. 1). Activating a delete button 406 deletes the current feature from the current user's account. The current feature remains in database 1004, but is not visible to the current user. A feature image section 408 provides instructions for the selection of images to be used for the current feature.

Referring to FIG. 15, a label 410 indicates which attribute of the current feature is being currently catalogued. Users may enter a new action into an action field 412. Users then associate the action with certain scenes. This process is described in detail below. Activation of an action button 412a stores the new action entered in action field 412 to database 1004 (FIG. 1). An action that has already been associated with certain scenes may be replaced with another action using an action reassignment section 414. First, users select the action to be replaced using an action replacement dropdown box 414a. Next, users select the action that will replace the action selected in box 414a using a replacement action dropdown box 416. Finally, users activate a replacement button 428 which replaces all the associations of the action selected in box 414a to each scene in database 1004 with an association between each scene and the action selected in box 416.

Actions are listed in fields, such as an action field 420, which are editable and used to update an action assigned to the current feature. A number label 422 displays the number of scenes with which the adjacent action is associated. A display button 418 toggles whether an adjacent action's scene number, such as number label 22, is displayed within the CMS applications associated with the current feature. If display button 418 is green, the corresponding value, such as the one within number label 22, is displayed in the corresponding data field within the associated CMS applications. An action hyperlink 424 links to a component of the web interface as shown in FIG. 23 that displays all the scenes associated with the action adjacent to hyperlink 424. Activation of a delete action button 426 removes an action from the current feature with database 1004 (FIG. 1).

Referring to FIG. 16, users enter the name of a new actor in a new actor field 432 and the name of a corresponding character played by the new actor in a new character field 434. If the new actor entered in new actor field 432 is a guest star, users mark a guest star checkbox 436. Activation of a post button 438 stores the information from fields 432 and 434, as well as guest star checkbox 436 in database 1004 (FIG. 1). Actors currently associated with the current feature are listed in an actors section 446. Fields, such as a name update field 440, are used to update the name of the actors associated with the current feature. Labels, such as a character label 442, shows the name of a character played by the actor listed in the adjacent name update field. An update image button 444 is used to toggle whether the actor is a guest star. If image button 444 appears as a star image, the associated actor is considered a guest star. Activation of button 448 stores the information entered in FIG. 16 in database 1004 (FIG. 1). Navigational links, such as a next hyperlink 450, directs the users to additional pages of actors.

Referring to FIG. 17, users enter the name of a new character in a new character field 452 and select which actor plays the new character using an actor dropdown box 454. If the character is considered a major character, users mark a major checkbox 456. If the character is a voiceover, users mark a voiceover checkbox 458. Activation of a post button 460 stores the new character information from field 452, dropdown box 454, major checkbox 456, and voiceover checkbox 458 in database 1004 (FIG. 1). Fields, such as a character field 462, are used to update the name of a character associated to the current feature. Dropdown boxes, such as an actor dropdown box 464, are used to select the actor that plays the character in the adjacent character field 462. A major image button 466 is used to toggle whether the adjacent character is a major character. If the adjacent character has been identified as a major character in database 1004, button 466 appears as a star. A voiceover image button 468 is used to toggle whether the adjacent character is a voiceover. If the adjacent character has been identified as a voiceover, button 468 appears as a microphone. Activation of an update button 470 stores the information entered in FIG. 17 in database 1004 (FIG. 1).

Referring to FIG. 18, an episode label 472 displays the number of episodes assigned to the current feature. An episode dropdown box 474 can be used to quickly filter the listing to the selected episode. Activation of an episode filter button 476 filters by the selection in dropdown box 474. Activation of a spell check button 478 checks the spelling of each field within FIG. 18. An update button 480 is used to store all the information entered in FIG. 18 in database 1004 (FIG. 1). A display image button 482 is used to display all episodes in a single page listing. An episode import button 484 links to a component of the web interface as shown in FIG. 19 that allows a user to import another episode. This process is described in more detail below. A new episode number field 486 is used to enter the number of a new episode. A season number dropdown box 488 is used to select the season with which to associate the new episode. The title of the new episode is entered into a new episode field 490. Activation of a post image button 492 stores the information corresponding to the new episode in fields 486 and 490 and dropdown box 488 in database 1004 (FIG. 1).

Fields, such as episode update field 498, lists episodes associated with the current feature and allows users to update the title of each episode. An episode number label 494 displays the number of the adjacent episode, while an episode season number label 496 displays the number of the season associated to the adjacent episode. A reel label 500 displays the reel on which the adjacent episode appears, while a scene label 502 displays the number of scenes in the adjacent episode. An image hyperlink 504 links to a component of the web interface as shown in FIG. 20 that allows users to enter information to be associated with the adjacent episode. An image hyperlink 506 links to a component of the web interface as shown in FIG. 23 that allows users to edit the information for all the scenes associated with the selected episode. A delete button 508 deletes the associated episode from the current feature. Page navigational hyperlinks 510 allow users to quickly navigate through all the episodes listed in FIG. 18.

Referring to FIG. 19, an episode import file field 924 is used to specify a file location for an EDL discussed above for importation into system 1000 (FIG. 1). Activation of a browse button 926 opens a file browser window to find and select an EDL to be imported into system 1000 (FIG. 1). Activation of a cancel button 928 cancels the episode importation component as shown in FIG. 19 and returns the current user to the episode management component as shown in FIG. 18. Activation of an import button 930 posts the EDL listed in file field 924 to system 1000 (FIG. 1), which then processes the EDL.

Referring to FIG. 20, a label 932 displays the title of the episode and the number of scenes assigned to the episode. An episode form 934 is used to edit the episode number. A title field 936 is used to edit the episode title. A season dropdown box 938 is used to select in which season the episode belongs, while a reel dropdown box is used to select on which reel the episode appears. A production field 942 is used to edit the episode production number. A rating field 944 is used to edit the episode rating. An aired field 946 is used to edit the date the episode aired. A synopsis field 948 is used to provide a brief description or synopsis of the episode. An image button 950 is used to display all the scenes associated with the current episode on a single page. A scene listing section 952 displays scene information for the scenes assigned to the current episode, including scene ID, title, time codes, etc. If a scene appearing in section 952 needs to be assigned to another episode, the users mark the associated scene checkbox, such as a scene checkbox 954, select the desired episode in a episode dropdown box 956, and activate a move button 958. The association between the selected scene and the current episode is changed in database 1004 (FIG. 1) to an association between the scene and the episode selected in dropdown box 956. A spell check button 960 is used to check the spelling of each field within FIG. 20. An update button 964 is used to store the information contained in the fields in FIG. 20 in database 4. An image button 962 links to a component of web interface as shown in FIG. 23 that allows users to edit all the scenes assigned to an episode.

Referring to FIG. 21, a label 534 shows the category of identifiers of the current feature presently being updated by the user. An input field 512 is used to enter a new location. An image button 514 is used to insert the new location in field 512 into database 1004 (FIG. 1). Two location dropdown boxes 516 and 518 and a replacement button 520 are used to replace the association between a location and certain scenes in database 1004 (FIG. 1) with an association between those scenes and an alternative location. This replacement action is approximately identical to that described above with reference to dropdown boxes 414 and 416 and button 428 (FIG. 15).

Fields, such as a location update field 522, are used to update the list of locations to be associated with scenes of the current feature. A label 524 displays the number of scenes associated with the corresponding location. A hyperlink 526 links to a component of the web interface as shown in FIG. 23 used to display and edit all scenes associated with a location. An image button 528 is used to delete a location from the current feature. A spell check button 530 is used to check the spelling of the words contained in the fields of the component displayed in FIG. 21. An update button 534 is used to store the information contained in the fields shown in FIG. 21 in database 1004 (FIG. 1).

Referring to FIG. 22, a label 536 shows the category of identifiers of the current feature presently being updated by the user. A reel input field 538 is used to enter a new reel and an image button 540 is used to store the name of the new reel in database 1004 (FIG. 1). Fields, such as a reel input field 542, are used to update the reels associated to the current feature. A scene hyperlink 544 links to a component of the web interface as shown in FIG. 23 that allows users to view and edit information of each scene associated with the selected reel. An image button 546 is used to delete a reel from the current feature. A spell check button 548 is used to check the spelling of the text within the fields of FIG. 22. An update button 550 is used to store all the information contained within the fields in FIG. 22 in database 1004 (FIG. 1).

The component of the web interface depicted by FIG. 23 shows a list of scenes of the current feature filtered by a value, attribute, rule, etc. and can be reached by a multiple of avenues and hyperlinks from within system 1000, such as hyperlinks 422 (FIG. 15), 502 (FIG. 18), and 524 (FIG. 21). Referring to FIG. 23, a label 552 displays the number of scenes within a particular list of scenes filtered as described above. A hyperlink 554 links to a component of the web interface as shown in FIG. 26 used to display and edit the associated scene. A label 556 displays the episode to which the selected scene is assigned. A scene ID label 558 displays the identification number assigned to the selected scene. A title and time label 560 displays the scene title and time codes assigned to the selected scene. An image delete button 562 is used to delete a scene from the current feature. An image button 564 is used to display all the filtered scenes on one webpage.

Referring to FIG. 24, a label 566 displays the 'Seasons' subtitle. A season field 568 is used to input a new season number. A year field 570 is used to input a year to associate with the new season number entered into field 568. An image button 572 stores the new season information contain in fields 568 and 570 in database 1004 (FIG. 1). Fields, such as an update season field 574, are used to update the season numbers of the current feature. Fields, such as update season year 576, are used to update the season year associated with the seasons of the current feature. A hyperlink 578 links to a component of the web interface as shown in FIG. 23 used to edit the selected scenes. An delete button 580 is used to delete a season from the current feature. An update button 582 is used to store all the information from the fields contained in the component depicted in FIG. 24 in database 1004 (FIG. 1).

Referring to FIG. 25, a label 584 displays the 'Subjects' subtitle. A subject input field 586 is used to enter a new subject identifier that will be used to index and catalogue the current feature as described in detail below. An image button 588 is used to store the new subject in field 586 in database 1004 (FIG. 1).

Two subject dropdown boxes 590 and 592 and a replacement button 594 are used to replace the association between a subject identifier and certain scenes in database 1004 (FIG. 1) with an association between those scenes and an alternative subject identifier. This replacement action is approximately identical to that described above with reference to dropdown boxes 414 and 416 and button 428 (FIG. 15).

Fields, such as an update subject field 596, are used to update the subject identifiers associated with the current feature. A label 598 is used to display the number of scenes associated with the adjacent subject identifier. A hyperlink 600 links to a component of the web interface as shown in FIG. 23 used to display and edit the scenes associated with the adjacent subject identifier. An image button 602 is used to delete a subject identifier from the current feature. A spell check button 604 is used to check the spelling of all the subject identifiers in FIG. 25. Update button 606 is used to store all the information related to the subject identifiers in FIG. 25 in database 1004 (FIG. 1).

The component illustrated by FIG. 26 allows the users of system 1000 to assign the specific identifiers created and managed as described above with respect to FIG. 3 through FIG. 25 to different scenes of the current feature and store these associations in database 1004 (FIG. 1). This component displays a list of scenes that can be edited and assigned identifiers by users. The list of scenes can vary and can include every scene within an episode, reel, season, etc. or include every scene that includes a particular actor, action, location, or other identifier. The component depicted by FIG. 26 is generally linked to by FIG. 23.

Referring to FIG. 26, a scene navigation section 608 is used to list scenes to be edited or assigned identifiers. As described above, the scenes in section 608 can vary from every scene within the current feature to scenes filtered by specific identifiers such as actions, actors, episodes, etc. The scene number and time code of each scene listed in section 608 is translated into a hyperlink, such as a scene hyperlink 610, which, when activated, selects the associated scene by loading any information associated with the selected scene from database 1004 (FIG. 1) into fields 614 through 670, which are described in more detail below.

Buttons that are displayed as images of a media clip, such as an image button 612, are displayed next to these hyperlinks, such as hyperlink 610, if the adjacent scene is associated with a corresponding media clip. Clicking on these buttons, such as image button 612, will play the associated media clip in a separate popup window. Activating a button 614 toggles between showing and hiding fields 616 through 666, which contain the information associated with the selected scene. A clip ID field 616 is used to enter a scene identifier for the selected scene. This identifier, however, does not have to be unique, can be the same as another scene's identifier, and is often repeated several times across different episodes. An image button 618 is similar to button 612 and appears if the selected scene has a corresponding media clip. Activating button 612 plays the corresponding media clip in a separate popup window. A delete button 620 is used to delete the selected scene from the current feature.

A scene title field 622 is used to store a one-line description of the selected scene and generally contains a brief introduction of the selected scene. An image button 624 is used to proof the title entered in field 622. If the selected scene has been loaded from database 1004 (FIG. 1), a field 626 displays the number and title of the episode assigned to the selected scene. If a user is using the component in FIG. 26 to create and edit a new scene, a dropdown box (not shown) replaces field 626 and contains all the episodes assigned to the current feature allowing the user to associate the new scene with an episode. Fields 628 though 642 are used to display and edit the beginning and ending time code for the selected scene. A dropdown box 644 is used for setting whether the selected scene occurs outside or inside. A duration label 646 displays the duration of the selected scene.

Sections 648, 654, 656, 658, and 660 are used to assign specific identifiers described above and defined using the other components of system 1000 (FIG. 1) illustrated in FIG. 3 through FIG. 25. The title bar of each of these sections includes a yellow pyramid down arrow (not labeled), of which toggles whether that section is displayed or condensed. Character identifiers (FIG. 17) defined as major characters are grouped together in a major character section 648, whereas character identifiers defined as minor characters are grouped together in a minor character section 654. Location identifiers (FIG. 21) are grouped together in a location section 656. Action identifiers (FIG. 15) are grouped together in an action section 658. Subject identifiers (FIG. 25) are grouped together in a subject section 660.

The specific identifiers listed within sections 648, 654, 656, 658, and 660 are displayed and assigned to the selected scene in an identical manner. Therefore, the manner in which the specific identifiers within each section are displayed and assigned to the selected scene will be described only with respect to the major character identifiers displayed within section 648. All the major character identifiers defined in the component of the web interface as shown in FIG. 17 are retrieved from database 1004 (FIG. 1) and displayed as text labels, such as an identifier label 650. Identifier checkboxes, such as an identifier checkbox 652, appear next to a corresponding identifier text label. The users determine whether any identifier appears or relates to the selected scene. If so, the users mark the checkbox, such as checkbox 652, corresponding to the identifier. The users mark any and all identifier checkboxes that correspond to each identifier that appears in or relates to the selected scene.

Users enter details of what occurs in the selected scene in a description section 662 and the dialogue of what is said in the selected scene in a script section 664. Additional keywords that relate to the selected scene may be entered in section 666.

The keywords are generally additional words not appearing within any identifier, the description, or the script that users may think will be used later to search for the selected scene.

A spell check button 668 is used to check the spelling of the text entered into any field within the component. Once all the desired information has been entered in the fields of the component and all identifiers to be assigned to the selected scene have been marked, the users activate an update button 670. Activation of button 670 stores the association of all the identifiers assigned to the selected scene in database 1004 (FIG. 1) as well as all the information entered in the fields of this component.

FIG. 27 is a flowchart that schematically illustrates a method for publishing the information and associations contained in database 1004, which was previously created and managed as described above with reference to FIG. 1 through FIG. 26. The method for publishing this information as depicted in FIG. 27 creates a front-end application that other users can access to search, locate, and retrieve desired clips of the selected feature based on the cataloging and indexing described above. The process of creating a front-end application is explained at this point at a high-level of detail with reference to FIG. 27, but will be explained in greater detail below with respect to FIG. 28 through FIG. 36.

Referring to FIG. 27, step 1100 is identical to step 1010 (FIG. 2), while step 1102 refers to the processes described above with reference to FIG. 1 through FIG. 26. The user then designs a user interface ("UI") at step 1104, which will allow other users to search database 1004 (FIG. 1). The UI is then customized at step 1106. Global parameters for the UI, which include background images, hyperlink colors, fonts, etc. are set at steps 1108 and 1110. Individual web interface components, such as a search component, a results component, a component displaying additional information, are defined at steps 1112, 1114, 1116, and 1118.

At step 1120, the user determines whether access to the UI should be restricted and, if so, sets up user accounts and passwords at step 1122. The process is complete at step 1124 and the user has set up a front-end application, which allows other users to use database 1004 (FIG. 1) to search for pertinent video clips or scenes.

FIG. 28 through FIG. 36 depict a portion of system 1000 that allows users to publish the information in database 1004 (FIG. 1) as described above with reference to FIG. 27. The portion of system 1000 illustrated by FIG. 28 through FIG. 36 is made available to users through a web interface, but it should be understood by those skilled in the art that this portion of system 1000 can also be a standalone program and should not be solely limited to a web interface. Each figure illustrates a separate component of the web interface and provides users with the ability to define and publish components of a front-end web interface. Other users are able to search database 1004 (FIG. 1) based on the specific identifiers set up above and retrieve media clips associated with the identifiers. The components illustrated in FIG. 28 through FIG. 36 are ASPs and created using HTML, forms, and scripts. These technologies should be understood by those skilled in the art, who should also understand that, when reference is made to fields within a form, all types of fields of an HTML form, and not just text fields, should be included within the reference.

It should be understood by one skilled in the art that the web interface described below with reference to FIG. 28 through FIG. 36 can be run from computer 1002 (FIG. 1), any other computers connected to computer 1002 by a network, or multiple computers connected to computer 1002. These figures illustrate how different components of the front-end application are designed and managed.

Referring to FIG. 28, the component contained therein can be used to set up and manage CMS applications for the current feature. Labels, such as a title label 672, display the title of any CMS applications associated with the current feature. Other labels, such as a date label 674 display the date on which the adjacent CMS application was created. An image button 676 links to a mass import component as described above with respect to FIG. 2a. An image button 678 links to a mass scene import component as described above with respect to FIG. 2b. A hyperlink 678a links to a component of the web interface as shown in FIG. 29 used to create a new CMS application.

Figure 29B:
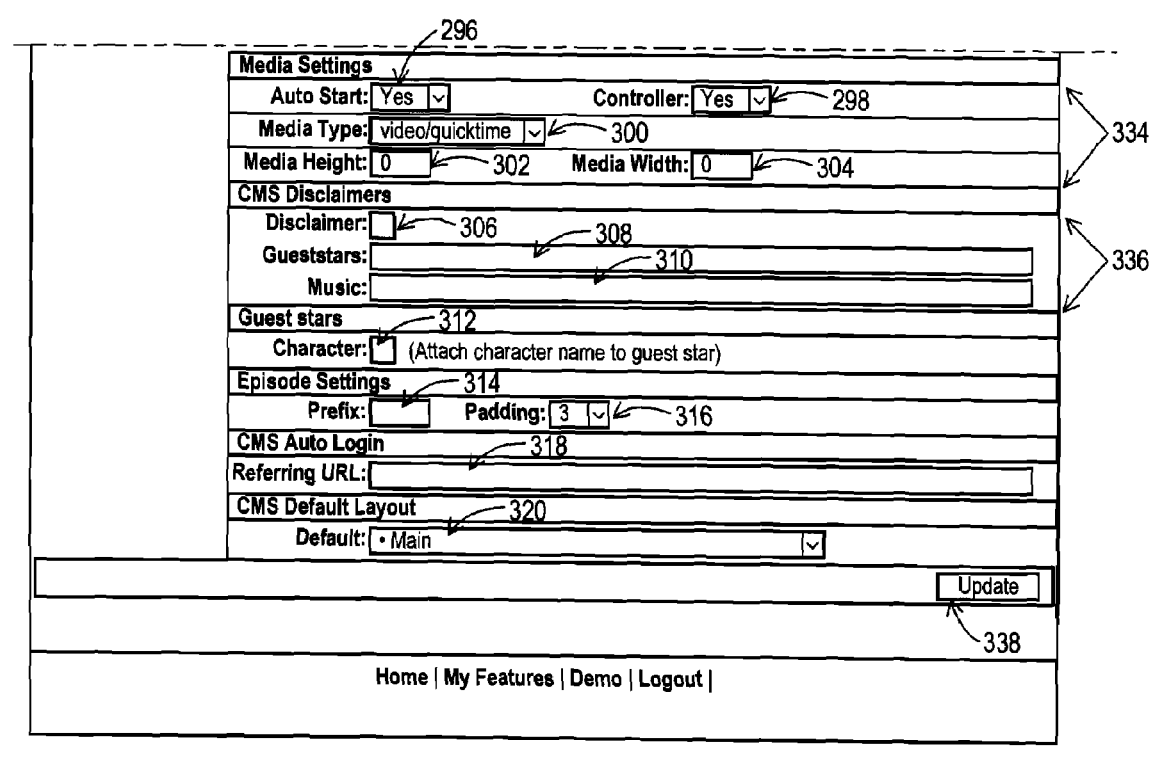

FIG. 29 illustrates a component of the web interface that is the default standard for setting up and managing a CMS application. A hyperlink 196 links to the component shown in FIG. 13. A hyperlink 198 opens a new default CMS application as shown in this FIG. A CMS section 200 displays the title of the CMS application. When the user is editing a specific CMS application layer, as described in detail below, the layer will be listed in section 200. A CMS label 202 displays the title of the current CMS application. Label 202, however, displays 'Default Feature' when working on the default CMS application. A hyperlink 204 links to the component as shown in FIG. 30 which contains the main settings and corresponds to the general layout for the current CMS application. A search definition hyperlink 206 links to the component as shown in FIG. 32 which displays predefined searches that allow CMS application users to quickly link to the predefined search simply by following the generated link. A layout hyperlink 208 links to a component as shown in FIG. 33 which displays layouts for the CMS application that are automatically created when the default CMS application is created. Several automatically-created layouts are included as shown in FIG. 33 when the CMS application is created. For example, the CMS layout as shown in FIG. 33 is automatically created for an 'Advertising' component and includes advertising related links, images, and data pertaining to the advertisement of the current feature. Likewise, a clipbin hyperlink layout 210 links to an automatically-created clipbin layout and displays user-created bins that are used to save clips which the CMS application users have selected. The ClipBin layout (not shown) includes three automatically-created sub-layouts: 'ClipBin Listing', 'ClipBin Print,' and 'ClipBin Scene'. 'ClipBin Listing' layout (not shown) displays a listing of all the scenes in a selected bin which the CMS user has selected. 'ClipBin Print' layout (not shown) is a printable layout of all the scenes in a selected ClipBin which the CMS user has selected. All CMS display graphics are removed and the layout is generic in display. 'ClipBin Scene' layout (not shown) is a layout providing the user with the details of a selected scene. Hyperlinks 212, 214, and 216 link to other automatically-created layouts in a manner similar to that described above with reference to hyperlink 208. The Login layout (not shown) is a predefined layout and is automatically created when a new CMS application is created. If a require login checkbox 902 (FIG. 30) is marked under the CMS settings, then CMS application users are presented with a login screen (not shown) before they are able use the CMS application.

A main layout hyperlink 218 links to the main layout setting for the CMS application as shown in FIG. 30 and is a predefined layout automatically created when a new CMS application is created. The Main layout (FIG. 30) is the general navigation starting point for the CMS application. It generally contains links to other layouts, such as Advertising, Publicity Search, as well as links to predefined searches. The design and function of a publicity hyperlink 220 operates in a manner similar to hyperlinks 212, 214, and 216 described above. The Publicity layout (not shown) is a predefined layout and is automatically created when a new CMS application is created. The Publicity layout displays publicity related links, images, and data pertaining to the publicity of the current feature.

A search layout hyperlink 222 links to a component as shown in FIG. 33. The Search layout component (FIG. 33) is a predefined layout and is automatically created when a new CMS application is created. The Search Layout component (FIG. 33) provides the CMS users with a search form allowing CMS users to search the episodes, scenes, and attributes for an identifier entered in the CMS Application. The Search Layout (FIG. 33) has three sub layouts: 'Search Listing', 'Search Print,' and 'Search Scene' (not shown).

A new layout hyperlink 224 links to a component as shown in FIG. 35 used to add additional layouts to the Default Feature CMS Settings (FIG. 29) and Feature CMS Settings (FIG. 30). A CMS default application image 226 is an image representing the CMS application being developed. If CMS application layers are not provided an image, image 226 will be displayed. This image is representative of the CMS application. A CMS ID label 228 is the unique identifier of the CMS application. When a new CMS application is created, it is also the name of the directory which is created to store all images and data needed for the CMS application. A FileMaker hyperlink 230 exports all feature data into a delimited format which can be directly imported into a FileMaker application. One skilled in the art should understand that FILE-MAKER is a third-party software that can be purchased from FileMaker, Inc. located in Santa Clara, Calif. A hyperlink 232 exports all the attribute data for the current feature which can be directly added into a FileMaker application.

A sub-domain field 234 is used when the CMS application is used as a sub-domain of tvprocms.com and movieprocms.com. The form entry is appended to the beginning of the domain and provides a user friendly URL to the CMS application. A settings section 236 displays general settings for the CMS application. A client name field 238 is used to hold and display the 'Terms of Use' statement and the copyright notice appended to the bottom of each layout in the CMS Application. A copyright field 240 is used to hold and display a copyright notice appended to the bottom of each layout in the CMS Application. A support email field 242 is used to enter the email address used for support of the CMS application. An image field 244 is used to upload a file for the image to be used as the CMS application default background image.

Browse button 246 opens a file browser window to locate and select an image file from the user's computer to apply as a background image to be used as the CMS application background image. A preview button 248 is used to preview the image file listed in field 244. An edit mode dropdown box 250 determines whether the CMS Application is currently in edit mode. Edit mode displays each layout element with a 1 pixel border. The border is used as a visual reference to precisely position each CMS Application layout. An update button 252 is used to update any changes made to the CMS Application Settings by storing the scene in database 1004 (FIG. 1).

The value of a dropdown box 254 determines the margin of space created around the layout of the CMS Application in the user's browser. Background color field 256 is the background color of the CMS application for any area located outside the background image of each layout. Color select hyperlink 258 is a user tool to quickly select colors used for the corresponding form field. The color selection tool generates the color code of a selected color and enters it into the corresponding form field. It is used for each form field requiring a color. Body color field 260 is the background color of the CMS application for any area located directly behind the background image. It is used as a contrast to the background color and is seen until the background image is loaded and displayed. Border color field 262 is the color used to generate the border around the CMS application and is used as the border for each layout element when Edit Mode is enabled as described above. Font family dropdown box 264 is the font family to be used to display text when an overriding layer font family is not used. Font color field 266 is the font color to be used to display text when an overriding layer font color is not used. Back color field 268 is the background color of form elements. Border color field 270 is the border color of form elements. Border size field 272 is the border size, in pixels, around form elements. Font size field 274 is the font size of text displayed in form elements. Font color field 276 is the font color of text displayed in form elements. Alignment dropdown box 278 is the text alignment of text displayed in form elements. Left padding dropdown box 280 is the padding, in pixels, preceding text displayed in form elements. Page size dropdown box 282 is the page size for layout elements that have listed results. Page size field 284 is the amount of text to be displayed before appending trailing periods, which is used for long data fields such as scene description and script fields. Show all field 286 allows the CMS users to view all data in database 1004 without having to perform a search. Option 'No' requires the user to perform a search before viewing data. This option helps speed up the CMS application by not allowing large result sets to be returned. Highlight dropdown box 288 is the highlight color for keyword, scene, and script searches. Text used in these type of searches are highlighted in the search results. Weight dropdown box 290 is the font weight for keyword, scene, and script searches. Text used in these type of searches are bolded in the search results. Font color field 292 is the font color for text in the search results listings. Skip size dropdown box 294 is the number of records to move ahead when a jump/skip button is used. Autostart dropdown box 296 is used to immediately play media when media is displayed on the layout. Controller dropdown box 298 displays a media controller when playing media. Media type dropdown box 300 displays the default media type for the CMS Application. Media height field 302 is the height of media when displayed on a layout. Media width field 304 is the width of media when displayed on a layout. Disclaimer checkbox 306 toggles whether the CMS Application content disclaimer and warning is appended to search results. Guest Stars field 308 is a disclaimer for guest stars used in the CMS Application. Music field 310 is a disclaimer for music used in the CMS Application. Characters checkbox 312 toggles whether the character name is attached when displaying guest stars. Prefix field 314 is a prefix to append when displaying episode numbers. Padding field 316 is the prefix padding to add when display episode numbers. Zeros are appended to the beginning of the episode numbers to fill up the padding spaces. Referring URL field 318 is used to automatically login users when coming from a trusted system or universal record locator ("URL"). Default layout dropdown box 320 is used to select the initial layout design to display when CMS users access the CMS application. An update button 338 updates the default CMS and CMS application settings.

FIG. 30 illustrates a component of the web interface that allows a user to modify CMS application features. A CMS hyperlink 680 links to the component as shown in FIG. 29 that are application-wide settings and apply to general function of the CMS application. A search definitions hyperlink 682 links to a component as shown in FIG. 32 used to remove, modify, and add predefined searches on the CMS application to be used by the CMS users. A layout section 684 provides links to other layouts within the CMS application as described above. A new layout hyperlink 686 links to a component as shown in FIG. 36 used to create a new layout. A CMS application image 688 is an image representing the CMS application being developed. A user checkbox 902 toggles whether CMS users are required to log in before performing searches. A user setup hyperlink 904, as shown in FIG. 30, links to a component of the web interface and opens a screen shot, as shown in FIG. 31, which is used to manage CMS user account, as described hereinafter.

Figure 31:
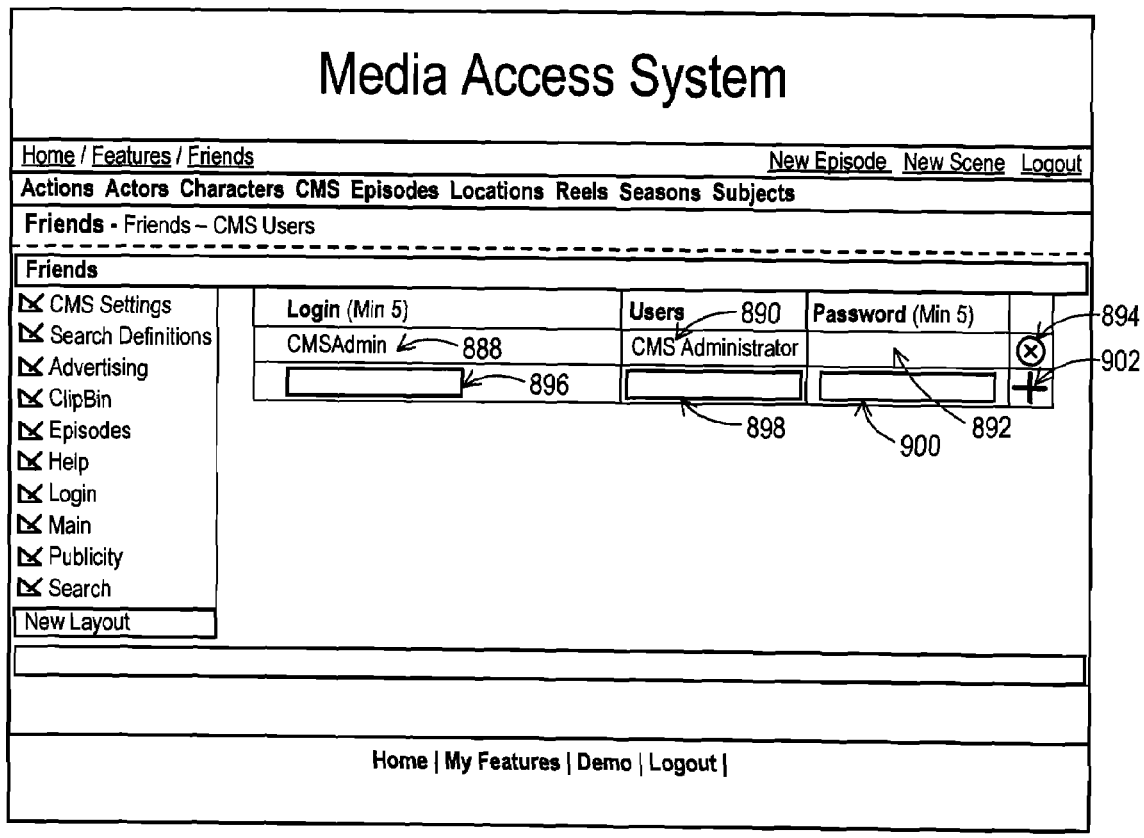
FIG. 31 is a schematic representation of a web interface component of an improved media access system in accordance with an embodiment of the present invention.

FIG. 31 illustrates a component of the web interface that allows users to modify CMS user settings. A label 888 displays the CMS application's administrator name. CMS use label 890 generally lists the company or full name of the CMS user. A password label 892 is the password of the user account needed to gain access to the CMS application. A delete button 894 deletes the selected user from the CMS application. An add field 896 is used to add a new CMS user login. An add new name field 898 is used to add a new name for the new CMS user login in field 896. An add password field 900 is used to add a new password for the new login in field 896. An add user button 902 adds the new user information listed in fields 896, 898, and 900 to the CMS application.

FIG. 32 illustrates a component of the web interface that allows a user to modify predefined searches as described above. A hyperlink 690 links to a component as shown in FIG. 33 used to define search settings. Hyperlinks, such as remove hyperlink 692, remove the selected defined search from the CMS application. A new definition hyperlink 694 links to the component shown in FIG. 33 used to add a new search definition.

FIG. 33 illustrates a component of the web interface that allows a user to add or modify the rules of defined searches. Search radio buttons 696 decide the type of search the CMS user is presented. The resulting text search (not shown) is presented to the CMS users as a clickable hyperlink that performs the defined search when clicked by the user. A search title field 698 is used to provide a user-friendly name of the new search. The title text is only displayed in the final CMS application when an image is not assigned to the defined search. A search label field 700 is used to provide a one line user-friendly descriptor of this search action. In the final CMS application, the text entered in field 700 is displayed when the user's mouse is moved over this search action. A search image field 702 is used to define an image to be displayed in place of the title text when this defined search is place on the CMS layout. A browse button 704 is used to open a file browser window to select the image file entered in field 702. A search criteria label 706 is used to copy a defined search criteria already assigned under a defined search. A hyperlink 708 is used to remove search criteria from a defined search. A radio option 710 determines which type of boolean to be used between multiple search criteria assigned to a defined search. A dropdown box 712 lists searchable data fields that can be assigned to a defined search. Search fields can be assigned only one at a time and can be used multiple times. Multiple select field 714 displays the value(s) to be used in the defined search criteria. Multiple fields may be selected. Based on the type of data field selected, the user will be presented with either a dropdown box or a text field. Multiple search radio options 716 decides what type of search to be used when multiple criteria values are selected. Note field 718 is used to display a general note for defined searches. An update button 720 is used to store the data entered in this component to database 1004. An image 722 displays the image assigned to defined search. This is the image that will be displayed when the defined search is placed on a layout.

Figure 34:
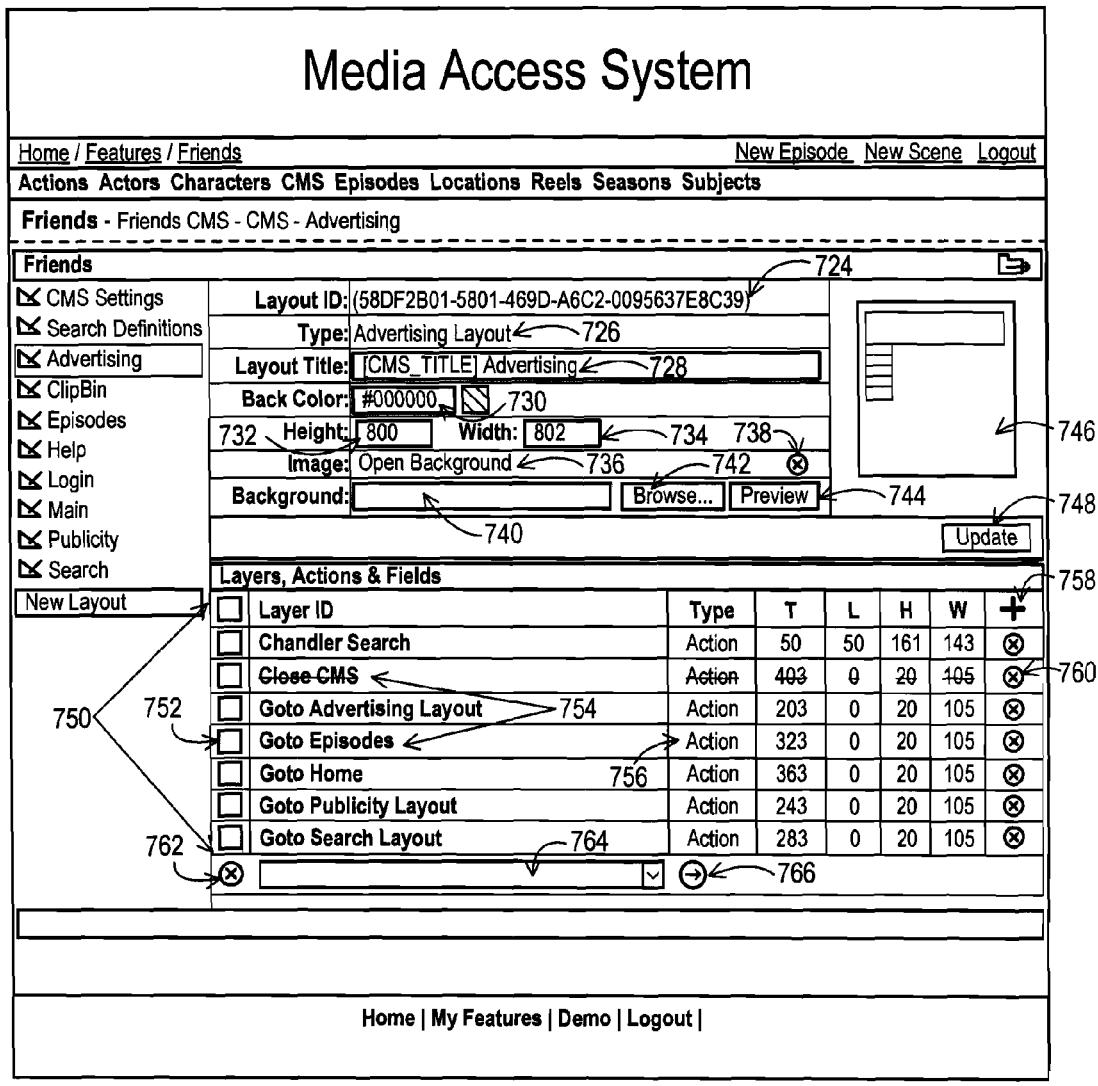
FIG. 34 is a schematic representation of a web interface component of an improved media access system in accordance with an embodiment of the present invention.

FIG. 34 illustrates a component of the web interface that allows a user to design a CMS layout as described above. A layout ID label 724 is a unique identifier of the layout in system 1000 (FIG. 1). It is used as the directory name for all the images used on the layouts in the CMS application. A layout type label 726 is the name of a defined layout type and is the name of the current layout type. A layout title field 728 is used to enter a layout title to be displayed in the browser title bar when viewed. Any item in brackets '[ ]' is an application variable and is replaced with its corresponding value when the application is viewed. A background color field 730 is used to define the background of the layer. This is only visible when the layout loads and if the layout does not have a background image. A layout height 732 is used to define the height of the layout in the browser. Field 732 is editable when there is not a background image. A layout width field 734 is used to define the width of the layout in the browser. Field 734 is editable when there is not a background image. A hyperlink 736 is used to view the background image in separate browser window. A remove hyperlink 738 is used to remove the background image from layout. An image field 740 is used as the upload file for the image file to be used as the layout background image. A browse button 742 is used to open a file browser window to find and select an image file to be used as the layout background image. A preview button 744 is used after the user selects an image file. This button replaces the current image in the upper right with the selected file image. An image 746 displays the current layout background image. An update button 748 is used to store the information contained in this component in database 1004. Section 750 lists all the layers assigned to a layout and includes hyperlinks to each layer management page as shown in FIG. 35. A checkbox 752 is used to select a layer on the layout. Checkbox 752 is used in conjunction with items 662, 664, and 666. A hyperlink 754 links to each layer management page as described below. When a layer is not displayed on a layout, it is written with a line through it, which means the layer is available but not displayed. Layer type label 756 lists the layer type, which includes an i-frame. Hidden, input, label, listing, media, multiple, part, select, text, textarea, checkbox, or radio. An image button 758 links a CMS application user to new layer form as shown in FIG. 36. A delete button 760 deletes the selected layer from the current layout. A second delete button 762 deletes the selected layers (item 650 in FIG. 26) from the current layout. A dropdown box 764 lists all the layouts in the CMS application. Box 764 allows a user to copy selected layers to a selected layout, and are used in conjunction with items 650 and 666 (FIG. 26). An image button 766 copies selected layers to selected layout, and is also used in conjunction with items 650 and 662 (FIG. 26).

FIG. 35 illustrates a component of the web interface that allows a user to define and modify layers as described above. An add layer button 768 links to a component as shown in FIG. 36 used to add a layer to the CMS application. A layer ID label 770 displays the unique system identifier for the selected layer. If the selected layer is not predefined then this is used to identify the layer in the CMS application. A layer field 772 is the layer name and is displayed in the layer listing under the layout page as described above. A layer top dropdown box 774 displays the multiple display types if a predefined layer has multiple display types. An update button 776 is used to store the information contained in this component in database 1004 (FIG. 1). A display index dropdown box 778 determines the order in the CMS application how layers are displayed. A text field 780 displays the text on the layer in the CMS application. Field 782, 784, 786, and 788 are used to define the location where the layer is displayed on the layout. A script field 790 displays the JavaScript® action or URL of the selected layer, which is processed when the CMS user clicks the selected layer. A target field 792 is the target URL when a CMS user clicks on the action layer. A help text field 794 is used to define the text displayed when the CMS user moves the mouse over the action layer. A font size field 796 is used to define the size of font used on the selected layer. A font weight field 798 is used to define the font weight used on the selected layer. Likewise, fields 800 and 802 are used to define other aspects of the font on the selected layer. A background color field 804 is used to define the background color of the selected layer. An image upload field 806 is used to define what image file will be used as the background image of the selected layer. A browse button 808 is used to open a file browser window to locate and select an image file to be used as the selected layout background image. An image type dropdown box is used to define the type of image file used.

FIG. 36 illustrates a component of the web interface that allows a user to create new layers as described above. A title field 814 is used to define the name of the new layer. A defined dropdown box 816 is used to select predefined layers pre programmed in system 1000 (FIG. 1). A search dropdown box 818 is used to select defined searches created under the component showing defined searches as shown in FIG. 32. A navigational dropdown box 820 allows a user to define links between CMS layouts. A label field 822 displays the text of the associated link. A URL link field 824 is used to define the URL to go to when the CMS user activates the a link on the new layer. A label field 826 defines the text of the hyperlink entered in field 824. A label field 828 is used to display text in the new layer without action. A label field 830 is used to define the URL of page to display in layer as an inline frame. An application section 832 lists items placed in brackets in layer data fields described above. The CMS application replaces the constants with corresponding application values. An add layer button 834 is used to store the information contained in this component in database 1004 and add the layer to the CMS layout. A cancel button 836 cancels the information entered in this component and returns user to the layout component as shown in FIG. 35.

Figure 37:
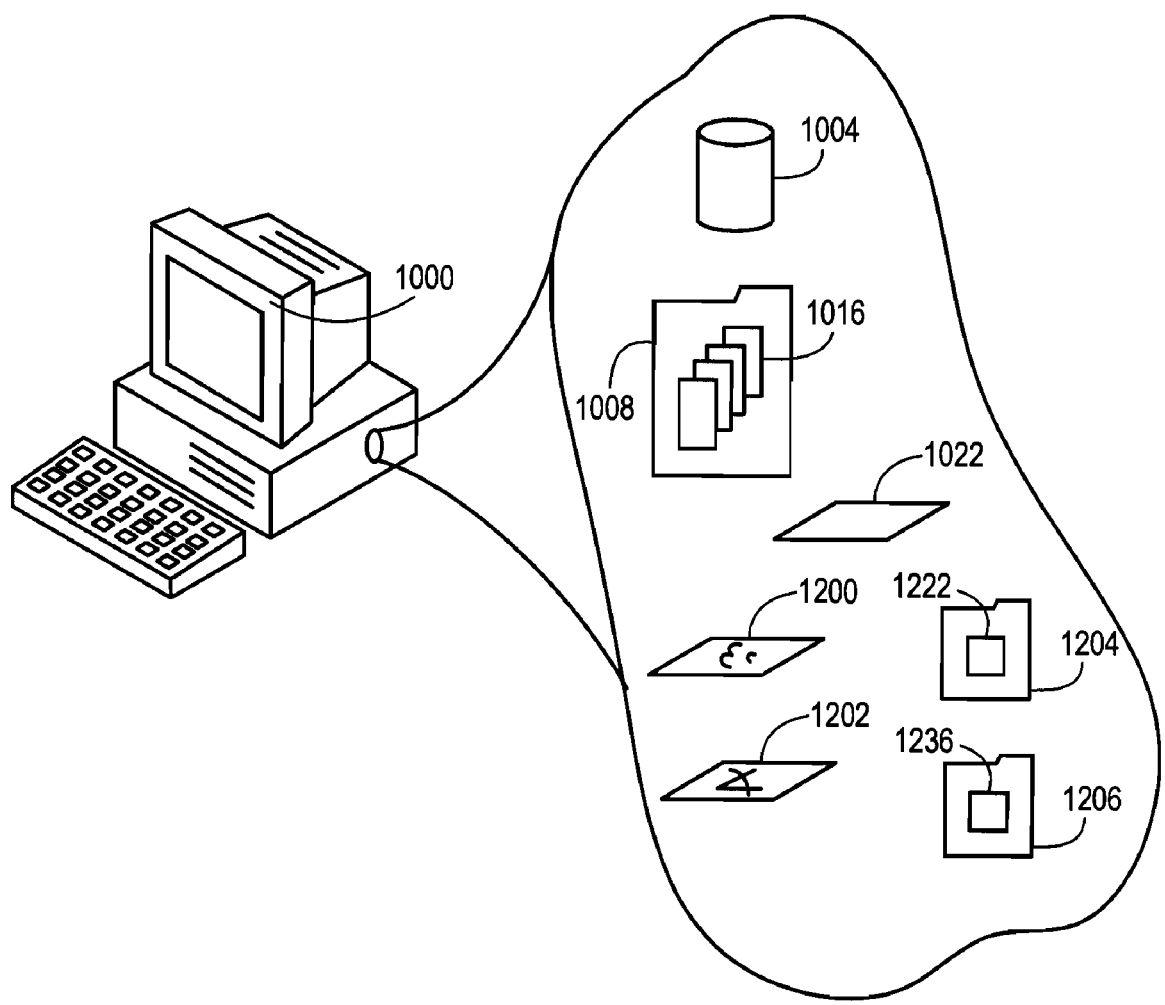
FIG. 37 is a schematic representation of an improved media access system in accordance with an embodiment of the present invention.

Referring to FIG. 37, in another embodiment of improved media access system 1000, the method described above with respect to FIG. 2 is automated to allow importation of a video along with cataloging and indexing specific identifiers with that video automatically. In this embodiment, system 10 includes a phonetic recognition program 1200 and visual recognition program 1202. System 1000 uses additional folders 1204 and 1206 for storage.

Figure 38:
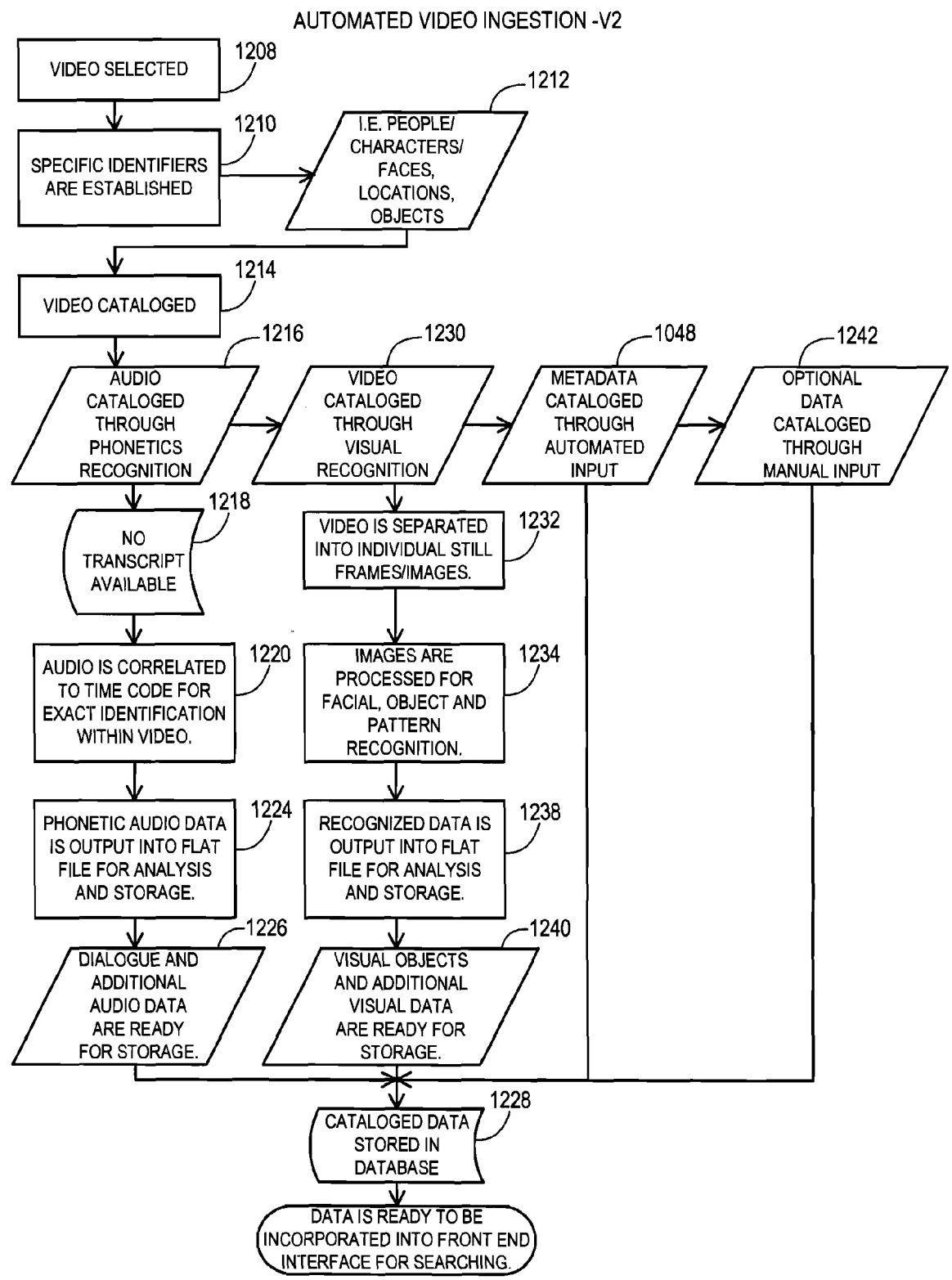
FIG. 38 is a flowchart of a method of an improved media access system in accordance with an embodiment of the present invention.

FIG. 38 is a flowchart that schematically illustrates a method employed by system 1000 (FIG. 37) for indexing video files based on specific identifiers in an automated manner. Referring to FIG. 37 and FIG. 38, the video is selected at step 1208, which is identical to step 20 (FIG. 2).

In a manner also similar to that described above with respect to steps 28 and 30 with reference to FIG. 2, users establish specific identifiers at steps 1210 and 1212, which will be used to index the relevant video. Once these identifiers have been established, the process of indexing and cataloging the video begins at step 1214. Audio from the video file is cataloged through phonetic recognition at step 1216. That is, phonetic recognition program 1200 phonetically processes the video file extracting each phonetic word and/or sound. Because phonetic recognition program 1200 extracts these phonetic words and sounds directly from the video file, the exact location, i.e., timeframe, where the phonetic word or sound occurs is known by the program. Phonetic recognition program 1200 stores the extracted words and sounds in flat file 1222. Phonetic recognition program 1200 continues to process the remaining video file in the same manner, extracting each phonetic word or sound. When complete, system 1000 stores a text version of the phonetic information extracted from the video file in an audio flat file 1222 for storage, as well as any additional processing that may be desired, at step 1224. The dialogue and additional audio data are ready for storage at step 1226 and are catalogued in database 1004 at step 1228.

At step 1230, system 1000 begins cataloging and indexing the video file based on visual identifiers established at steps 1210 and 1212. Visual recognition program 1202 processes the video file by separating it into individual frames and images at step 1232. At step 1234, visual recognition program 1202 extracts each object or image and stores a text representation of any recognized visual information from the video file and the corresponding timeframe in a video flat file 1236 for storage, as well as any additional processing that may be desired, at step 1238. The visual objects and additional visual data are ready for storage at step 1240.

In a manner identical to step 1048 with respect to FIG. 2, metadata embedded in the video file is automatically extracted from the video file and stored in database 1004 by system 1000 at step 1228. The users also possess the option of manually entering and storing other information, which associates an established or new identifier with scenes, frames, clips, etc., in database 1004 at step 1242. This process of manual cataloging and indexing is identical to the method described in detail above with respect to FIG. 3 through FIG. 36.

Objects and images within consecutive frames of a video file will generally be the same until a scene or angle change. At an angle change, objects and images appearing in the same scene will look different because they are viewed from a different angle. Other objects and images may also be revealed due to scene being filmed from a different angle. In comparison, when a scene change occurs within a video file, a black frame is generally inserted to split the scenes.

Still referring to FIG. 38, in another embodiment visual recognition program 1202 separates the video file into individual scenes and angle changes instead of separate frames and images at step 1232. Visual recognition program 1202 extracts recognized objects and images from the first frame of the video file at step 1232 in the same manner as described above with reference to FIG. 38. As above, system 1000 stores a text representation of the object and the timeframe within video flat file 1236 at step 1238. Visual recognition program 1202 then compares the subsequent frame to the frame just analyzed. If no scene or angle change has occurred, meaning that the subsequent frame is generally similar to the previous frame, visual recognition program 1202 skips the subsequent frame and moves on to the next frame. When visual recognition program 1202 determines that a scene or angle change has occurred, it processes the current frame as described above with respect to the first scene by extracting the objects and images and storing the information in flat file 1236. Visual recognition program 1202 continues to process the video file until all frames have been analyzed. Because individual frames of the same scene filmed at the same angle are generally similar, visual recognition program 1202 only needs to analyze frames occurring after a scene and/or angle change. Skipping sufficiently similar frames as described above with respect to this embodiment rather than processing each individual frame has the effect of more efficiently analyzing the video, thus, applying less stress on the hardware of system 1000.

Figure 39:
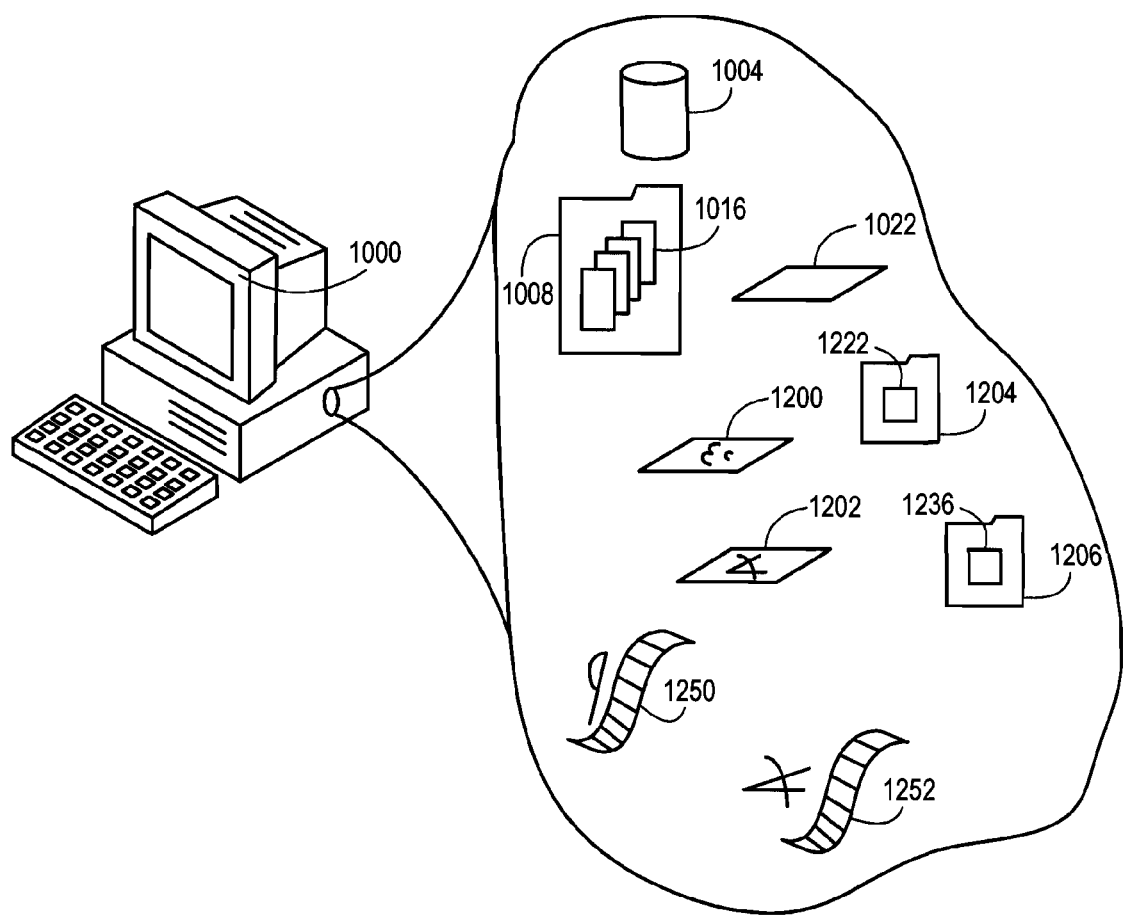
FIG. 39 is a schematic representation of an improved media access system in accordance with an embodiment of the present invention.
Figure 40:
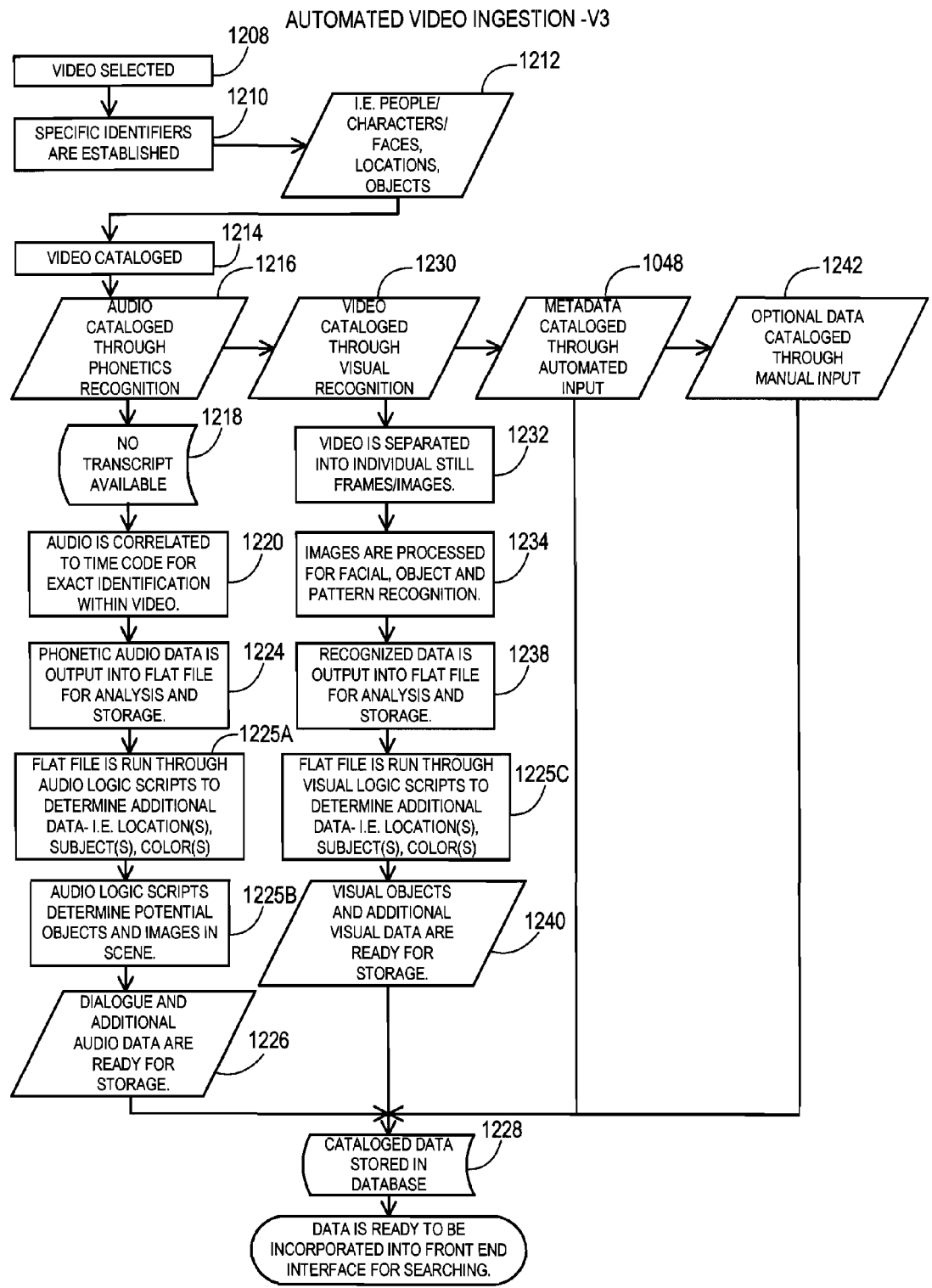
FIG. 40 is a flowchart of a method of an improved media access system in accordance with an embodiment of the present invention.

FIG. 39 and FIG. 40 respectively depict another embodiment of improved media access system 1000 and a method for automatically importing, indexing, and cataloging a video based on specific identifiers. In this embodiment, system 1000 includes audio logic scripts 1250 and video logic scripts 1252. FIG. 40 is a flowchart identical to FIG. 39 with the exception of additional steps 1225*a*, *b*, and *c*.

Referring to FIG. 39 and FIG. 40, at step 1225*a* audio flat file 1222 created at step 1224 is analyzed by audio logic scripts 1250. In other words, audio logic scripts 1250 iterate through audio flat file 1222 comparing the text representation of the words and sounds contained in the file to the identifiers established at steps 1210 and 1212. Words and sounds sufficiently similar to any identifier is stored in database 1004 by system 1000 at step 1228. Another purpose of the analysis by audio logic scripts 1250 at step 1225*a* is to determine if any phonetic words and sounds stored in audio flat file 1222 are somehow related or correlate to the established identifiers. For example, if audio flat file 1222 included the word "airport," this may also indicate that the related scene includes airplanes, baggage, terminals, airlines, etc. Depending on the rules within audio logic scripts 1250 set by the users, audio logic scripts 1250 may determine an item in audio flat file 1222 sufficiently relates to another established identifier. If so, system 1000 ascertains the timeframe of the video where the word or sound occurs and stores an association between that timeframe and any additional identifiers in database 1004. Step 1225*b* allows system 1000 to index and catalogue the video with identifiers based on related phonetic information contained in audio flat file 1222, as opposed to only visual matches from steps 1234 and 1238.

Still referring to FIG. 39 and FIG. 40, at step 1225*c* video flat file 1236 created at step 1238 is analyzed by video logic scripts 1252. In other words, video logic scripts 1252 perform an analysis on video flat file 1236 correlating to the analysis performed by audio logic scripts 1252 on audio flat file 1222 at steps 1225*a* and 1225*b* described above. Moreover, depending on the rules within video logic scripts 1252 set by the users, video logic scripts 1252 may determine that the text representation of an object or image sufficiently relates to another established identifier. If so, system 1000 ascertains the timeframe from the video where the object appears and stores an association between that timeframe and any additional identifiers in database 1004. Step 1225*c* allows system 1000 to index and catalogue additional identifiers that are sufficiently related to other identifiers that may have been missed at steps 1232 and 1234 or are difficult or incapable of recognition by visual recognition program 1202 due to the way they appear in the video.

U.S. Pat. Nos. 5,664,227, 5,835,667, and 6,859,799, as well as published patent application nos. 20050283752, 20050114132, 20040227529, 20040024597, and 20030094953, are incorporated by reference as if set forth herein verbatim.

Accordingly, it will be understood that various embodiments of the present invention described herein are preferably implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable to through wireless communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions will be described in the general context of computer-executable instructions, such as program modules, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, or other input devices (not shown), such as a microphone, game pad, satellite dish, scanner, or the like. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernable therefrom. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A method for indexing video files, the method comprising the steps of:

selecting a video and loading the video into a video editing program;

segmenting the video into short clips using the video editing program, wherein each short clip includes time codes identifying where the respective short clip occurs within the video;

creating an edit decision list (EDL), the EDL containing information corresponding to the video and each of the short clips segmented from the video;

importing the video and EDL, parsing the EDL, and automatically populating a database with names of the short clips and with the time codes of the short clips obtained from the EDL information; and cataloging the video for later searching, identification, and retrieval of one or more of the short clips contained in the video, the step of cataloging further comprising:

establishing a plurality of specific identifiers associated with the video wherein the specific identifiers include names of actors appearing in the video, names of characters played by the actors, physical locations shown in the video, common actions performed by the characters in the video, and common physical objects appearing in the video;

analyzing each short clip and identifying which of the previously established specific identifiers of the plurality of specific identifiers associated with the video are included within each respective short clip;

transcribing audio from the video and associating the relevant portions of the transcribed audio with the corresponding short clip and with the corresponding character who spoke the audio in the short clip;

extracting metadata from each short clip and associating the metadata with the respective short clip; and storing the transcribed audio, the identified specific identifiers, and metadata associated with each of the short clips in the database in a computer searchable format for later searching and retrieval of selected short clips.

2. The method of claim 1, further comprising retrieving one or more selected short clips from the database by selecting and searching upon one or more of the specific identifiers.

3. The method of claim 1, further comprising importing the video and EDL using a web interface.

4. The method of claim 1, further comprising importing the video and EDL using a standalone program.

5. The method of claim 1, wherein the video includes one or more episodes of a multi-season television series and wherein the information contained in the EDL includes season number and episode number of the short clips in the video.

6. The method of claim 1, further comprising converting the video into a digital format.

7. The method of claim 1, wherein the step of cataloging further comprises adding a new specific identifier to the plurality of specific identifiers associated with the video.

8. The method of claim 7, wherein the step of adding the new specific identifier occurs after the step of analyzing at least one short clip of the video.

9. The method of claim 1, wherein establishing the plurality of specific identifiers occurs prior to and independent of the step of cataloging the video.

10. The method of claim 1, wherein the step of transcribing audio further comprises checking the transcript for errors, and ensuring information is formatted correctly.

11. A method for indexing video files, the method comprising the steps of:

selecting and loading a video into a video editing program;

segmenting the video into short clips using the video editing program, wherein each short clip includes time codes identifying where the respective short clip occurs within the video;

creating an edit decision list (EDL), the EDL containing information corresponding to the video and each of the short clips of the video;

importing the video and EDL, parsing the EDL, and automatically populating a database with names of the short clips and with the time codes of the short clips obtained from the EDL information; and cataloging the video for later searching, identification, and retrieval of one or more of the short clips contained in the video, the step of cataloging further comprising:

establishing a plurality of specific identifiers associated with the video wherein the specific identifiers include names of actors appearing in the video, names of characters played by the actors, physical locations shown in the video, common actions performed by the characters in the video, and common physical objects appearing in the video;

analyzing selected frames of each short clip and identifying which of the previously established specific identifiers of the plurality of specific identifiers are included within the selected frames;

associating the identified specific identifiers of the selected frames with the corresponding short clips; and storing the associated identified specific identifiers with the corresponding short clips in the database in a computer searchable format for later searching and retrieval of selected short clips.

12. The method of claim 11, further comprising transcribing audio from each of the short clips, associating the transcribed audio with the respective short clip, storing the transcribed audio in the database, and storing the association between the transcribed audio and the respective short clip in the database.

13. The method of claim 12, wherein the step of transcribing audio further comprises checking the transcript for errors, and ensuring information is formatted correctly.

14. The method of claim 11, further comprising extracting metadata from each short clip, associating the metadata with the respective short clip, storing the metadata in the database, and storing the association between the metadata and the respective short clip in the database.

15. The method of claim 11, wherein the step of cataloging further comprises adding a new specific identifier to the plurality of specific identifiers associated with the video.

16. The method of claim 11, further comprising retrieving one or more selected short clips from the database by selecting and searching upon one or more of the specific identifiers.

17. The method of claim 11, further comprising importing the video and EDL using a web interface.

18. The method of claim 11, further comprising importing the video and EDL using a standalone program.

19. The method of claim 11, wherein the video includes one or more episodes of a multi-season television series and wherein the information contained in the EDL includes season number and episode number of the short clips in the video.

20. The method of claim 11, further comprising converting the video into a digital format.

21. The method of claim 11, wherein the step of cataloging further comprises adding a new specific identifier to the plurality of specific identifiers associated with the video.

22. The method of claim 21, wherein the step of adding the new specific identifier occurs after the step of analyzing selected frames of at least one short clip of the video.

23. The method of claim 11, wherein the step of cataloging the video further comprises separating the video into a plurality of individual frames and images.

24. The method of claim 11, wherein the step of analyzing selected frames of each short clip and identifying which of the previously established specific identifiers of the plurality of specific identifiers are included within the selected frames further comprises extracting objects and images from the selected frames using a visual recognition program.

25. The method of claim 24, wherein the selected frames comprise frames occurring after a scene or camera angle change within the respective short clip.

26. The method of claim 24, wherein the extracted objects and images from the selected frames are converted to textual representations of the objects and images.

* * * * *